(12) United States Patent
Dayan et al.

(10) Patent No.: US 12,363,092 B2
(45) Date of Patent: *Jul. 15, 2025

(54) AGENTLESS SINGLE SIGN-ON FOR NATIVE ACCESS TO SECURE NETWORK RESOURCES

(71) Applicant: CyberArk Software Ltd., Petach-Tikva (IL)

(72) Inventors: Tomer Dayan, Petach-Tikva (IL); Ofir Iluz, Petach-Tikva (IL); Yaron Nisimov, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 201 days.

This patent is subject to a terminal disclaimer.

(21) Appl. No.: 18/217,189

(22) Filed: Jun. 30, 2023

(65) Prior Publication Data

US 2024/0179141 A1    May 30, 2024

Related U.S. Application Data

(63) Continuation-in-part of application No. 18/059,780, filed on Nov. 29, 2022, now Pat. No. 11,818,119.

(51) Int. Cl.
*H04L 29/06*    (2006.01)
*H04L 9/40*    (2022.01)

(52) U.S. Cl.
CPC ........ *H04L 63/0815* (2013.01); *H04L 63/102* (2013.01); *H04L 63/20* (2013.01)

(58) Field of Classification Search
CPC ....... H04L 63/20; H04L 63/083; H04L 63/10; H04L 63/108; H04L 63/0807; H04L 63/0884
See application file for complete search history.

(56) References Cited

U.S. PATENT DOCUMENTS

| | | | |
|---|---|---|---|
| 10,116,658 B2 * | 10/2018 | Sade | .......... H04L 63/0807 |
| 10,681,547 B1 * | 6/2020 | Yang | .......... H04L 63/0263 |
| 2016/0164878 A1 | 6/2016 | Nakano | |
| 2017/0208055 A1 | 7/2017 | Golwalkar et al. | |
| 2021/0119764 A1 | 4/2021 | Meghji | |
| 2021/0250422 A1 | 8/2021 | Mladin et al. | |
| 2022/0109675 A1 | 4/2022 | Williams et al. | |
| 2022/0188448 A1 | 6/2022 | Levit et al. | |
| 2022/0255931 A1 | 8/2022 | Avetisov et al. | |

* cited by examiner

*Primary Examiner* — Longbit Chai
(74) *Attorney, Agent, or Firm* — Finnegan, Henderson, Farabow, Garrett & Dunner, LLP

(57) ABSTRACT

Disclosed embodiments relate to systems and methods for providing agentless single sign on for native access to secure network resources. Techniques include receiving a request from a network identity to access a network resource; authenticating the network identity using a native client and communication protocol through an authentication process with the native client; sending a first secret to the network identity through the native client; authorizing the network identity based on one or more access policy; identifying, based on the one or more access policy, an account associated with a second secret; accessing the at least one network resource using the second secret; and enabling the network identity to access the at least one network resource using the account using the native client and communication protocol.

18 Claims, 16 Drawing Sheets

AGENTLESS SINGLE SIGN-ON FOR NATIVE ACCESS TO SECURE NETWORK RESOURCES

CROSS-REFERENCE TO RELATED APPLICATIONS

The present application is a continuation-in-part of, and claims the benefits of priority to, U.S. application Ser. No. 18/059,780, filed on Nov. 29, 2022, which is incorporated by reference herein in its entirety.

BACKGROUND

Technical Field

The present disclosure relates generally to cybersecurity and, more specifically, to techniques for secured access to network resources using native clients and existing communication protocols.

Background Information

Modern computer systems use a variety of permission structures to grant users access to secure network resources. A common approach for authorizing access to secure network resources is to provide credentials through persistent authorization after verifying a user's identity using some form of single or multi-factor authentication. Under this approach, users may retain long-lived credentials to access network resources, such as usernames, passwords, or API keys that typically do not expire. Users may be given long-standing permission to access a variety of secure network resources that may extend past the time that the user needs the higher levels of permission. It can be difficult to track highly valuable credentials in growing organizations with large numbers of privileged accounts, making it easy for organizations to lose record of which users have access to which network resources and the permission levels each user maintains. Weak management of credentials may lead to credentials being forgotten, duplicated, or stolen.

Although privileged permissions and credentials are aimed at maintaining the security of network resources, they are also avenues for attackers to gain unauthorized access to privileged network resources. There are a variety of ways to protect secure network resources from hackers. System administrators may set policies regarding password complexity and frequency of password changes among users. Networks may run discovery for unmanaged privileged accounts and credentials to detect indicators that permissions may have been compromised. Networks may also isolate certain permissions and monitor sessions using those permissions to further detect if an account has been compromised. However, the large quantity of standing privileged accounts within an organization provides hackers increasing opportunities to attack secure network resources.

An alternative approach to securing network resource access is to minimize the number of standing privileged accounts. Just-in-time privileged access to network resources may be created, and this just-in-time access may minimize the number of standing privileged accounts within an organization. Fewer standing privileged accounts may decrease the opportunities for attackers to infiltrate secure network resources. However, these just-in-time privileged access systems may be difficult for end users because these systems require the installation and use of agents by the end user. These solutions may also be difficult to implement at a large organizational scale.

Therefore, to address these technical and security deficiencies, solutions should implement the use of just-in-time privileged accounts while maintaining an easy-to-use interface for end users. Such techniques should allow for agentless access to secure network resources. These techniques should allow end users to access network resources using native clients and existing communication protocols without any modification to the network resource itself. By allowing end users to access secure network resources through an agentless system using a native client and communication protocol, the number of standing privileged accounts may be reduced while still maintaining a user-friendly interface for end users. These techniques may provide increased security of network resources by reducing the use of standing privileged accounts and thus minimizing an attacker's ability to infiltrate a secure network resource.

SUMMARY

The disclosed embodiments describe non-transitory computer readable media for providing agentless single sign on for native access to secure network resources. For example, in an embodiment, a non-transitory computer readable medium may include instructions that, when executed by at least one processor, may cause the at least one processor to perform operations for providing agentless single sign on for native access to secure network resources. The operations may comprise receiving a request from a network identity to access a network resource; authenticating the network identity using a native client and communication protocol through an authentication process with the native client, wherein the native client is configured for communicating transparently with the at least one network resource; sending a first secret to the network identity through the native client; authorizing the network identity based on one or more access policy, the one or more access policy comprising rules for accessibility of the at least one network resource; identifying, based on the one or more access policy, an account associated with a second secret; accessing the at least one network resource using the second secret; and enabling the network identity to access the at least one network resource using the account using the native client and communication protocol.

According to a disclosed embodiment, authenticating the network identity may comprise multi-factor authentication.

According to a disclosed embodiment, the operations may further comprise sending the first secret to the network identity automatically after the network identity is authenticated.

According to a disclosed embodiment, the operations may further comprise sending the first secret to the network identity in response to a command triggered by the network identity as part of the native communication protocol.

According to a disclosed embodiment, the first secret may comprise at least one of: a binary file, a textual file, binary data, textual data, or a certificate.

According to a disclosed embodiment, the operations may further comprise: receiving a second request from the network identity to access at least one of the network resource or an additional network resource; and authenticating the network identity using the native client or a second native client, wherein authenticating the network identity may comprise receiving the first secret from the network identity.

According to a disclosed embodiment, authenticating the network identity using the native client or the second native client may further comprise receiving data associated with the network identity.

According to a disclosed embodiment, the data may include metadata associated with the network identity, the metadata comprising at least one of: a username of the network identity; a group the network identity is associated with; a role the network identity is associated with; a type of authentication used for the network identity; an IP address associated with the network identity; a type of the native client; a location of the network identity; a network provider for the network identity; a license associated with the network identity; or a device identifier.

According to a disclosed embodiment, authenticating the network identity using the native client or the second native client may further include using the data to enforce additional rules for accessibility of the network resource or the additional network resource.

According to a disclosed embodiment, the operations may further comprise: receiving from the network identity second data associated with the network identity; comparing the data to the second data; and authorizing the network identity based on the comparison.

According to a disclosed embodiment, the operations may further comprise, based on a determination that the data at least partially matches the second data, validating the first secret.

According to a disclosed embodiment, the operations may further comprise, based on a determination that the data does not match the second data, performing at least one security action.

According to a disclosed embodiment, access to the at least one of the network resource or the additional network resource according to the second request may be associated with an additional account, the additional account being different from the account associated with the second secret.

According to a disclosed embodiment, access to the at least one of the network resource or the additional network resource according to the second request may be associated with an additional secret, the additional secret being different from the second secret.

According to a disclosed embodiment, the first secret may be received as part of the second request.

According to a disclosed embodiment, the authentication may be part of an interactive session with the network resource or the additional network resource and the first secret may be received through the interactive session.

According to another disclosed embodiment, a computer-implemented method for providing agentless single sign on for native access to secure network resources may be provided. The method may comprise receiving a request from a network identity to access at least one network resource; authenticating the network identity using a native client and communication protocol through an authentication process with the native client, wherein the native client is configured for communicating transparently with the at least one network resource; sending a first secret to the network identity through the native client; authorizing the network identity based on one or more access policy, the one or more access policy comprising rules for accessibility of the at least one network resource; identifying, based on the one or more access policy, an account associated with a second secret; accessing the at least one network resource using the second secret; and enabling the network identity to access the at least one network resource using the account using the native client and communication protocol.

According to a disclosed embodiment, the method may further comprise: receiving a second request from the network identity to perform an action on the at least one network resource; and authenticating the network identity using a native client, wherein authenticating the network identity may comprise receiving the token from the network identity, without receiving the credential.

According to a disclosed embodiment, authenticating the network identity may include receiving data associated with the network identity and the authentication may be based on the data.

BRIEF DESCRIPTION OF THE DRAWINGS

The accompanying drawings, which are incorporated in and constitute a part of this specification, illustrate disclosed embodiments and, together with the description, explain the disclosed embodiments.

DETAILED DESCRIPTION

Figure 1:
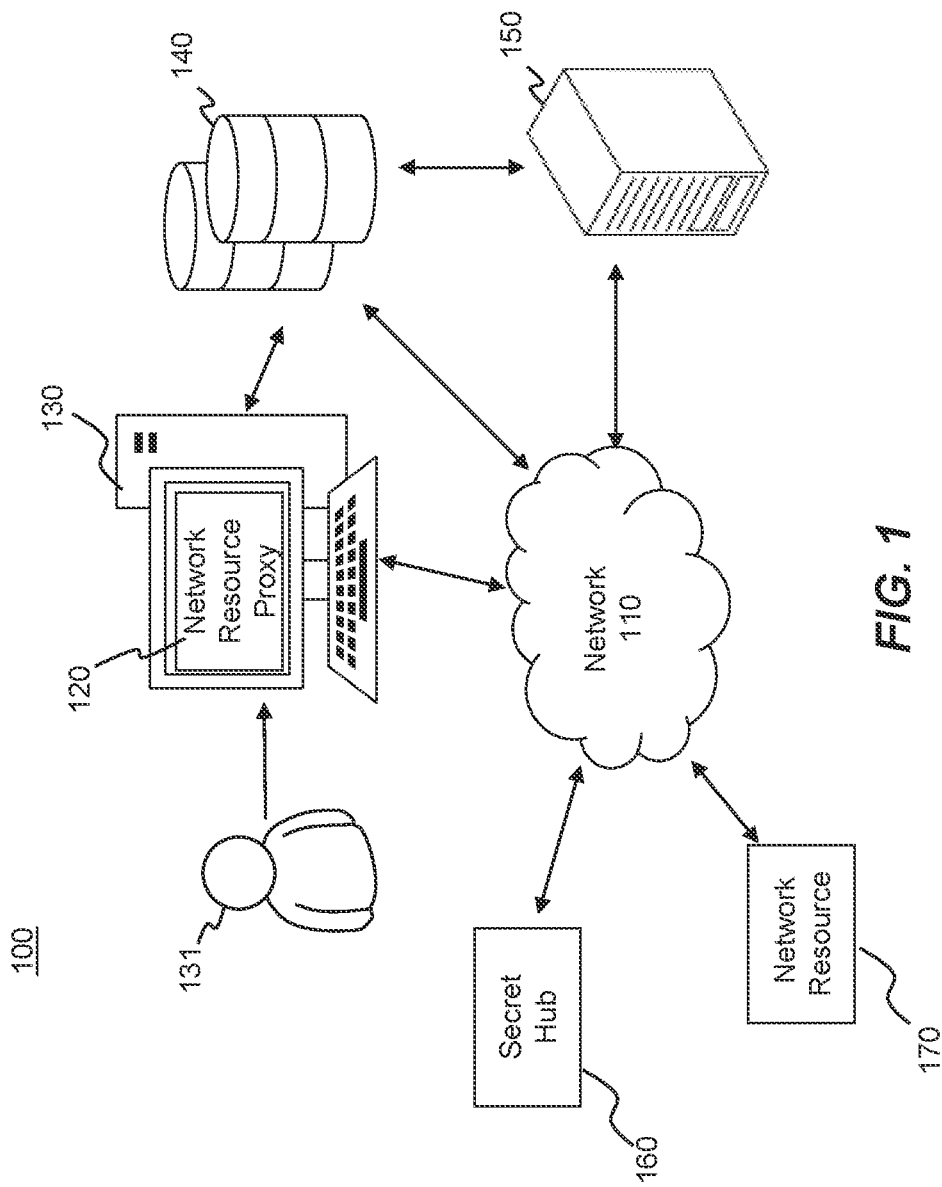
FIG. 1 is a block diagram of an exemplary system for providing dynamic and least-privilege access to a network resource in accordance with disclosed embodiments.

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence or constrained to a particular system configuration. Additionally, some of the described embodiments or elements thereof can occur or be performed simultaneously, at the same point in time, or concurrently.

The techniques for providing dynamic and least-privilege access to a network resource described herein overcome several technological problems relating to security, efficiency, and functionality in the fields of cybersecurity and software management. In particular, the disclosed embodiments provide techniques for providing just-in-time access to network resources. As discussed above, attackers may target credentials to access secure network resources. Reducing the number of standing privileged accounts through the use of just-in-time privileged access may reduce the opportunities for attackers to gain access to secure network resources. Existing techniques for providing just-in-time privileged access, however, fail to provide an agentless system that uses native client and communication protocols.

The disclosed embodiments provide technical solutions to these and other problems arising from current techniques. For example, various disclosed techniques create efficiencies over current techniques by authenticating and authorizing a network identity based on one or more access policy and generating least-privilege ephemeral credentials to access a network resource or matching an existing account to the network identity. The disclosed techniques also do not require passwords or other user credentials to be stored on a client device, thereby improving security in the network. The disclosed techniques further limit the scope of access granted to a user such that user access is narrowly tailored based on permissions associated with the access requests of the user. Further, the disclosed techniques do not require a dedicated agent or client to be installed on a client device for establishing a secure connection. The user only needs software components that are native to the user device or operating system. For example, remote access to the network resource may be established using a native client and communication protocol, without the need for a VPN client, a web-based portal, or other non-native software. This improves the experience for the user and provides increased flexibility in the types of devices that can access the network resource.

The disclosed techniques may also provide various additional enhancements over current techniques through the use of a native client and communication protocol. For example, in some embodiments, the disclosed techniques may provide a single sign-on (SSO) authentication process for a user through the native client. Accordingly, a user may sign on to access a network resource using the dynamic and least-privilege access to the network resource described above and may be provided a secret for subsequent access without the need to reauthenticate to the system. In some embodiments, the disclosed techniques may further provide additional authorization layers through an additional set of rules defined in an access policy. These additional rules may allow for additional authorization requirements, which may not be natively supported for a network resource.

In some embodiments, the disclosed techniques may include generating one or more new entities for processing requests by a network identity. For example, a new entity may be an additional network resource (e.g., an additional server, etc.) or may be an enhancement to an existing network resource (e.g., an index, etc.). The new entity may allow actions to be performed on a network resource more efficiently. As another example, the system may generate one or more in-memory caches for performing requests. If data is available in the cache, the cached data may be used to perform the requested action, rather than data in the network resource, which may improve efficiency, security, and overall performance of the system. In some embodiments, the cache may be part of a content delivery network, allowing regional sharing of cached data. The various additional techniques disclosed herein thus provide, among other things, improvements in efficiency, performance, and security over conventional techniques.

Reference will now be made in detail to the disclosed embodiments, examples of which are illustrated in the accompanying drawings.

FIG. 1 illustrates an exemplary system 100 for providing dynamic and least-privilege access to a network resource, consistent with the disclosed embodiments. System 100 may represent an environment in which software code is developed and/or executed, for example in a cloud environment. System 100 may include one or more network resource proxies 120, one or more computing devices 130, one or more databases 140, one or more servers 150, one or more secret hubs 160, and one or more network resources 170 as shown in FIG. 1.

The various components may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 100 is shown as a network-based environment, it is understood that the disclosed systems and methods may also be used in a localized system, with one or more of the components communicating directly with each other.

Computing devices 130 may be a variety of different types of computing devices capable of developing, storing, analyzing, and/or executing software code. For example, computing device 130 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 130 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 130 may operate using a Windows™ operating system, a terminal-based (e.g., Unix or Linux) operating system, a cloud-based operating system (e.g., through AWS™, Azure™, IBM Cloud™, etc.), or other types of non-terminal operating systems. As discussed further below, computing devices 130 may be used for developing and/or running software code, functions, or scripts. For example, a user 131 may develop software code through an Integrated Development Environment (IDE) 132 operated on computing device 130.

System 100 may further comprise one or more database(s) 140, for storing and/or executing software. For example, database 140 may be configured to store software or code, such as code developed using computing device 130. Database 140 may further be accessed by computing device 130, server 150, or other components of system 100 for downloading, receiving, processing, editing, or running the stored software or code. Database 140 may be any suitable combination of data storage devices, which may optionally include any type or combination of databases, load balancers, dummy servers, firewalls, back-up databases, and/or any other desired database components. In some embodiments, database 140 may be employed as a cloud service, such as a Software as a Service (SaaS) system, a Platform as a Service (PaaS), or Infrastructure as a Service (IaaS) system. For example, database 140 may be based on infrastructure or services of Amazon Web Services™ (AWS™), Microsoft Azure™, Google Cloud Platform™, Cisco Metapod™, Joyent™, vmWare™, or other cloud computing providers. Data sharing platform 140 may include other commercial file sharing services, such as Dropbox™, Google Docs™, or iCloud™. In some embodiments, data sharing platform 140 may be a remote storage location, such as a network drive or server in communication with network 110. In other embodiments database 140 may also be a local storage device, such as local memory of one or more computing devices (e.g., computing device 130) in a distributed computing environment.

System 100 may also comprise one or more server device(s) 150 in communication with network 110. Server device 150 may manage the various components in system 100. In some embodiments, server device 150 may be configured to process and manage requests between computing devices 130 and/or databases 140. In embodiments where software code is developed within system 100, server device 150 may manage various stages of the development process, for example, by managing communications between computing devices 130 and databases 140 over network 110. Server device 150 may identify updates to code in database 140, may receive updates when new or revised code is entered in database 140, and may participate in providing dynamic and least-privilege access to network resources as discussed below in connection with the following embodiments.

System 100 may also comprise one or more network resource proxies 120 in communication with network 110. Network resource proxy 120 may be any device, component, program, script, or the like, for providing dynamic and least-privilege access to network resources within system 100, as described in more detail below. Network resource proxy 120 may be configured to monitor other components within system 100, including computing device 130, database 140, and server 150. In some embodiments, network resource proxy 120 may be implemented as a separate component within system 100, capable of analyzing software and computer codes or scripts within network 110. In other embodiments, network resource proxy 120 may be a program or script and may be executed by another component of system 100 (e.g., integrated into computing device 130, database 140, or server 150). Network resource proxy 120 may further comprise one or more components for performing various operations of the disclosed embodiments. For example, network resource proxy 120 may be configured to generate a least-privilege ephemeral account having ephemeral credentials based on one or more access policy and enable a network identity to access a network resource using the least-privilege ephemeral account using a native client and communication protocol as discussed below. Network resource proxy 120 may further be configured to match an existing account to a network identity based on one or more access policies and enable the network identity to access the network resource using the matched existing account, using native client and communication protocols.

System 100 may further comprise a secret hub 160. Secret hub 160 may be any form of secure storage location for storing secrets, which may include, but are not limited to, passwords, credentials, encryption keys, tokens, certificates, or any other form of access credential for use in applications, services, privileged accounts, and other secure network resources. Secret hub 160 may allow for central management of secrets across multiple accounts within a network and allow security access policies to be consistently enforced across multiple accounts. In particular, secret hub 160 may encrypt and store credentials required to access network resource 170. Secret hub 160 may authenticate and authorize users, machines, or applications attempting to access one or more secrets before permitting access to stored sensitive data. As an example implementation, secret hub 160 may be implemented as a CyberArk™ vault or the like. Alternative implementations of secret hub 160 are possible as well.

System 100 may further comprise a network resource 170. Network resource 170 may refer to any type of computing resource within a network that may be accessed by entities (e.g., users, machines, applications) through a communications network. Examples of network resources 170 may include servers, databases, or data structures holding confidential information, restricted-use applications, operating system directory services, access-restricted cloud-computing resources, sensitive IoT equipment, or any other computer-based equipment or software that may be accessible over a network (e.g., network 110). Other examples of network resources 170 may include files, folders, elements in cloud buckets, databases, serverless function settings, logs, computer programs, computer codes, machine executable instructions, or any other type of data that may be stored in a data structure. In some embodiments, network resource 170 may be a privileged resource to which access is limited or restricted.

Figure 2:
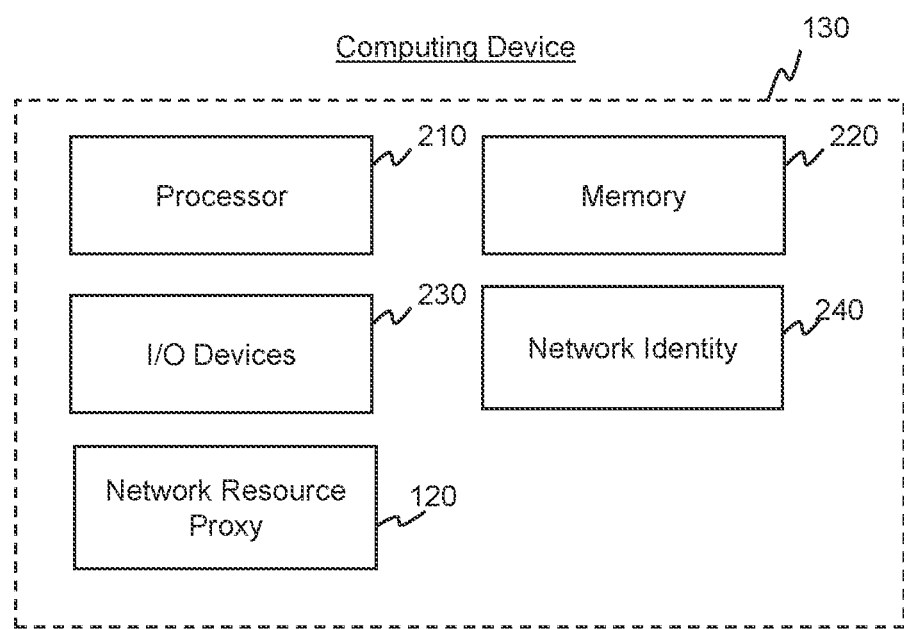
FIG. 2 is a block diagram showing an exemplary computing device including a network resource proxy for providing dynamic and least-privilege access to a network resource in accordance with disclosed embodiments.

FIG. 2 is a block diagram showing an exemplary computing device 130 including network resource proxy 120 in accordance with disclosed embodiments. Computing device 130 may include a processor 210. Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMD®, Qualcomm®, Apple®, NVIDIA®, or the like. The processor 210 may also be based on the ARM architecture, a mobile processor, or a graphics processing unit, etc. In some embodiments, network resource proxy 120 may be employed as a cloud service, such as a Software as a Service (SaaS) system, a Platform as a Service (PaaS), or Infrastructure as a Service (IaaS) system. For example, network resource proxy 120 may be based on infrastructure of services of Amazon Web Services™ (AWS™), Microsoft Azure™, Google Cloud Platform™, Cisco Metapod™, Joyent™, vmWare™, or other cloud computing providers. The disclosed embodiments are not limited to any type of processor configured in the computing device 130.

Memory (or memories) 220 may include one or more storage devices configured to store instructions or data used by the processor 210 to perform functions related to the disclosed embodiments. Memory 220 may be configured to store software instructions, such as programs, that perform one or more operations when executed by the processor 210 to provide dynamic and least-privilege access to network resources from computing device 130, for example, using the various exemplary methods described in detail below. The disclosed embodiments are not limited to software programs or devices configured to perform dedicated tasks. For example, the memory 220 may store a single program, such as a user-level application, that performs the functions of the disclosed embodiments, or may comprise multiple software programs. Additionally, the processor 210 may in some embodiments execute one or more programs (or portions thereof) remotely located from the computing device 130. Furthermore, the memory 220 may include one or more storage devices configured to store data (e.g., machine learning data, training data, algorithms, etc.) for use by the programs, as discussed further below.

Computing device 130 may further include one or more input/output (I/O) devices 230. I/O devices 230 may include one or more network adaptors or communication devices and/or interfaces (e.g., WiFi, Bluetooth®, RFID, NFC, RF, infrared, Ethernet, etc.) to communicate with other machines and devices, such as with other components of system 100 through network 110. For example, network resource proxy 120 may use a network adaptor to scan for code and code segments within system 100. In some embodiments, the I/O devices 230 may also comprise a touchscreen configured to allow a user to interact with network resource proxy 120 and/or an associated computing device. The I/O device 230 may comprise a keyboard, mouse, trackball, touch pad, stylus, and the like.

Network identity 240 may refer to any entity that may request access to network resource 170. In some embodiments, network identity 240 may refer to a particular user or account. For example, network identity 240 may include user 131 associated with one or more credentials for accessing the network resource 170. In some embodiments, network identity 240 may include a client device through which user 131 may access network resource 170. For example, a client device may be a personal computer (e.g., a desktop or laptop computer), a mobile device (e.g., a mobile phone or tablet), a wearable device (e.g., a smart watch, smart jewelry, implantable device, fitness tracker, smart clothing, head-mounted display, etc.), an IoT device (e.g., smart home devices, industrial devices, etc.), or any other device that may engage in accessing network resource 170. In some embodiments, network identity 240 may be a virtual machine (e.g., based on AWS™, Azure™, IBM Cloud™, etc.), container instance (e.g., Docker™ container, Java™ container, Windows Server™ container, etc.), or other virtualized instance. In some embodiments, network identity 240 may be a software instance or application executing on a client device. Using the disclosed methods, network identity 240 may access network resource 170 through a least-privilege ephemeral account using native client and communication protocols.

Aspects of the present disclosure may involve providing dynamic and least-privilege access to a network resource. Dynamic and least-privilege access may refer to providing a minimum level of access to a network identity that is needed to perform a requested action on the network resource. For example, the dynamic and least-privilege access granted to a network identity may be limited or restricted to allow the network identity to access only the elements of a network resource that are needed to complete a specific task or request. The dynamic and least-privilege access may allow a network identity to access network resources or run privileged commands on network resources on a temporary and as-needed basis, using one or more native client and communication protocols. Providing dynamic and least-privilege access to a network resource may comprise provisioning privileged just-in-time access to network resources. For example, access to network resources may be provided to users based on dynamic access policy rules and requirements.

Figure 3:
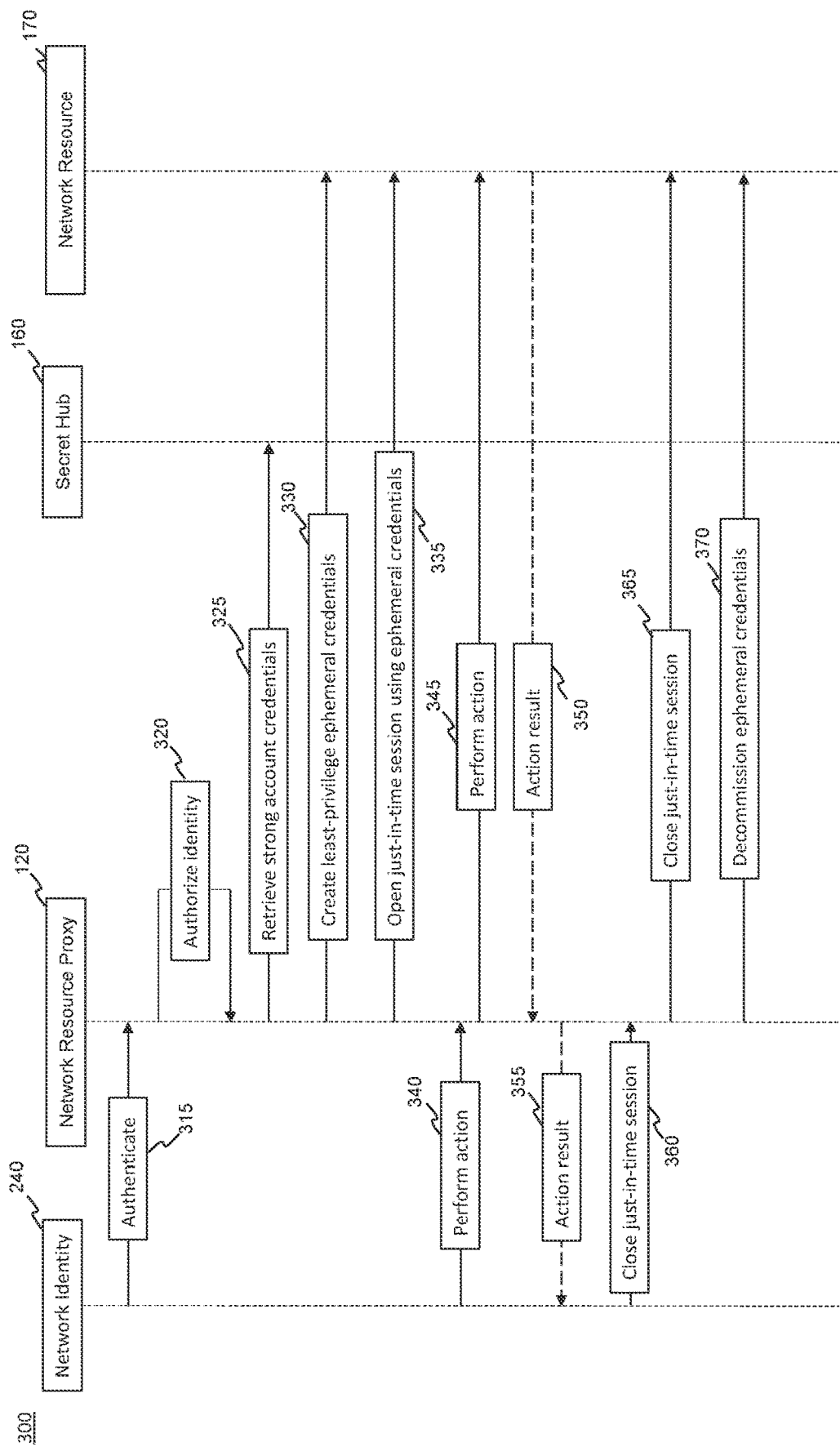
FIG. 3 is a block diagram showing an exemplary process for providing dynamic and least-privilege access to a network resource in accordance with disclosed embodiments.

FIG. 3 is a block diagram illustrating an exemplary process 300 for providing dynamic and least-privilege access to a network resource, consistent with disclosed embodiments. Process 300 may provide dynamic and least-privilege access to network resource 170 by network identity 240. As used herein, accessing network resource 170 may include any operation by a network device or network identity involving data or information stored on network resource 170, storing information on network resource 170, deleting or modifying information on network resource 170, or any other forms of operations requiring access to network resource 170.

At step 315 of process 300, the network identity may be authenticated by network resource proxy 120. Authenticating network identity 240 may in some embodiments include verifying the identity of network identity 240. For example, authentication of network identity 240 may be performed according to at least one of RDP, SSH, Password Authentication Protocol (PAH), Challenge Handshake Authentication Protocol (CHAP), Basic Access Authentication, Host Identity Protocols, tabular data stream (TDS), OpenID, Security Assertion Markup Language (SAML), HTTPS, TLS, or any other authentication protocol. In some embodiments, authentication may be performed through biometric authentication (e.g., a retinal scan, facial recognition, a fingerprint scan, a voiceprint identification, etc.), a user pin, a password, scanning a QR code, device-based authentication, or any other method suitable for authenticating network identity 240. In some embodiments, authentication of network identity 240 may be a single-factor authentication, requiring satisfaction of one factor for authentication. In other embodiments, authentication of network identity 240 may require two-factor or multi-factor authentication, which requires satisfaction of at least two factors for authentication.

At step 320 of process 300, network resource proxy 120 may authorize network identity 240. Authorization of network identity 240 may determine if network identity 240 has the necessary level of permissions to access network resource 170. Authorizing network identity 240 may include checking the authentication credentials of network identity 240 against one or more access policy to determine if network identity 240 may access network resource 170. For example, authorization may be granted through authorization strategies such as role-based access control (RBAC), attribute-based access control (ABAC), Relationship Based Access Control (ReBAC), graph-based access control (GBAC), and discretionary access control (DAC). Further, in some embodiments behavioral analysis or machine learning techniques may be used to perform the authorization. Authorization may verify access to the requested network resource 170 and determine whether network identity 240 can access network resource 170 and perform requested actions.

At step 325 of process 300, network resource proxy 120 may retrieve strong account credentials from secret hub 160. Secret hub 160 may contain API keys, passwords, certificates, strong account credentials, and other sensitive data in a secure storage system. Strong account credentials may be any type of privileged credentials that may be used to generate least-privilege ephemeral credentials. For example, strong account credentials stored in secret hub 160 may have more privileges than ordinary credentials and may be used to perform administrative tasks, create and modify user accounts, install software, update security, enable interactive logins, generate least-privilege ephemeral credentials, or any other tasks that ordinary credentials may not be permitted to perform. In this manner, strong account credentials may have a meaning known in the art and objectively determined, through reference to the use of other credentials in the system that are weaker or less permissive. Such a two-tier (or multi-tier) model of credentials may be used to distinguish strong account credentials from other credentials. Network resource proxy 120 may retrieve strong account credentials from secret hub 160 through a privileged access manager. For example, network resource proxy 120 may send a request to secret hub 160 to retrieve strong account credentials. In response, secret hub 160 may retrieve the strong account credentials, decrypt the protected strong account credentials, and return the strong account credentials to network resource proxy 120 over a secured channel.

At step 330 of process 300, network resource proxy 120 may create least-privilege ephemeral credentials. Ephemeral credentials may be dynamically created credentials that are generated at the moment access to network resource 170 is needed. Ephemeral credentials may provide a token or certificate necessary for network identity 240 to access or perform a requested action on network resource 170. Ephemeral credentials may expire after a specified period of time and may not be refreshed after expiration in some embodiments. Least-privilege ephemeral credentials may be generated based on one or more access policy in further embodiments. One or more access policy may contain the access level needed for network identity 240 to access or perform a requested action on network resource 170. A least-privilege ephemeral credential may be generated by comparing the requested action to the access level contained in the one or more access policy. In some embodiments, generating a least-privilege ephemeral account may be performed using a strong account.

At step 335 of process 300, network resource proxy 120 may open a just-in-time session to access network resource 170 using ephemeral credentials. A just-in-time session is a connection between network resource proxy 120 and network resource 170 that is created for a limited time to allow network identity 240 to access or perform a specific task on network resource 170. For example, a just-in-time session may be provisioned to elevate network identity 240 to access privileged network resource 170 on an as-needed basis for a limited time. The ephemeral credentials may be used to provision a one-time-use and just-in-time session between network proxy 120 and network resource 170. For example, network resource proxy 120 may create a reverse tunnel from network resource 170 to the customer environment which may connect network identity 240 to network resource 170 using the ephemeral credentials.

At step 340, network identity 240 may perform an action on network resource proxy 120 and at step 345, network resource proxy 120 may communicate that action to network resource 170. Network identity 240 may perform actions using native client and communication protocols without an agent. For example, network identity 240 may use a native client such as MS SQL Server Native Client, CLI, VSCode, PUTTY, KITTY, MobaXterm, WinSCP, SmaTTY, Bitvise SSH Client, Terminals, iTerm2, Terminus, ZOC Terminal, OpenSSH, or any other native client to perform actions on network resource proxy 120. Network identity 240 may perform actions such as accessing network resource 170, storing information on network resource 170, deleting or modifying information on network resource 170, or any other forms of operations requiring access to network resource 170. Network resource 170 may then verify the requested action from network identity 240 against one or more access policy to confirm network identity 240 has the necessary permissions to perform the requested action. If network resource 170 determines network identity 240 has the necessary permissions, network resource 170 may perform the requested action.

At step 350 network resource 170 may communicate an action result to network resource proxy 120 and at step 355 network resource proxy 120 may communicate the action result to network identity 240. After an action has been performed on network resource 170, network resource 170 may send information or data about the action result to network resource proxy 120. Network resource proxy 120 may then communicate the received information or data about the action result to network identity 240. Network identity 240 may then receive the information or data about the action result through the native client being used by network identity 240.

At step 360, network identity 240 may close the just-in-time session and at step 365, network resource proxy 120 may communicate that the just-in-time session has been closed to network resource 170. Network identity 240 may close the just-in-time session by terminating the session with network resource proxy 120. The just-in-time session may also be closed as a result of a violation of an access policy. For example, the just-in-time session may be terminated because an idle time of network identity 240 may exceed a specified duration of the access policy, network identity 240 may request to perform an action type that is not permitted under the access policy, network identity 240 may request to access a table or schema of network resource 170 that is not accessible under the access policy, network identity 240 may voluntarily end the connection after completing the requested actions, network identity 240 may be determined to be associated with anomalous or suspicious network behavior, or for any other reason that a connection may be terminated between network identity 240 and network resource 170.

At step 370 of process 300, network resource proxy 120 may decommission ephemeral credentials that provided access to network resource 170. Decommissioning the ephemeral credentials may comprise deleting the ephemeral credentials. For example, if network identity 240 attempted to connect to network resource 170 using the ephemeral credentials after terminating the just-in-time session, access would be denied because the ephemeral credentials would no longer exist. In further embodiments, network credentials may be invalidated, a network certificate or token may be erased, or any other form of access to network resource 170 through the ephemeral credentials may be deleted, revoked, or disabled. After the ephemeral credentials are decommissioned, network identity 240 would have to repeat process 300 to access network resource 170 or to perform additional actions on network resource 170.

Figure 4:
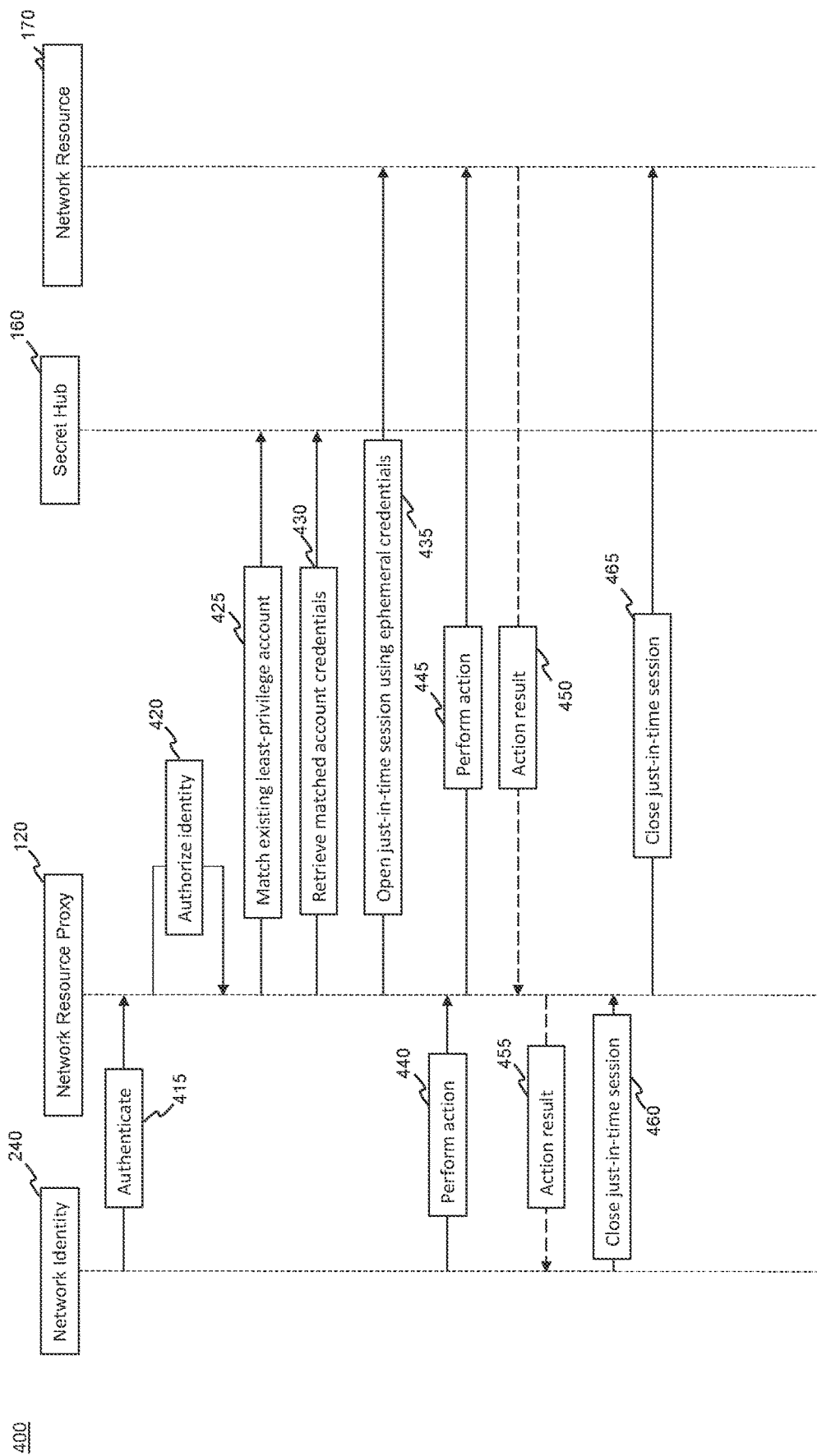
FIG. 4 is a block diagram showing an exemplary process for providing dynamic and least privilege access to a network resource using matched existing credentials in accordance with disclosed embodiments.

FIG. 4 is a block diagram depicting an exemplary process 400 for providing dynamic and least-privilege access to a network resource, consistent with the disclosed embodiments. At step 415, network resource proxy 120 may authenticate network identity 240. At step 420, network resource proxy 120 may authorize network identity 240. At step 435, network resource proxy 120 may open a just-in-time session with network resource 170 using ephemeral credentials. At steps 440 and 445, network identity 240 may perform an action on network resource proxy 120 and network resource proxy 120 may communicate the performed action to network resource 170. At steps 450 and 455, network resource 170 may communicate an action result to network resource proxy 120 and network resource proxy 170 may communicate the action result to network identity 240. At steps 460 and 465, network identity may close the just-in-time session with network resource proxy 120 and network resource proxy 120 may close the just-in-time session with network resource 170. Steps 415, 420, and 435-465 may correspond with steps 315, 320, and 335-365 of process 300, as described herein.

At step 425, network resource proxy 120 may match an existing least-privilege account from secret hub 160. An existing least-privilege account may be an account stored in secret hub 160 that is not decommissioned or deprovisioned after use by a network identity. For example, an existing least-privilege account may be an account stored in secret hub 160 that has permissions to access and perform one or more specific actions on network resource 170. Matching an existing least-privilege account from secret hub 160 may be based on one or more access policies. In some embodiments, network resource proxy 120 may match an existing least-privileged account based on a predefined permitted existing account list that network identity 240 may be authorized to use based on one or more access policy. For example, network resource proxy 120 may identify an existing least-privileged account in secret hub 160 based on a list of permitted existing accounts and determine that network identity 240 is authorized to use the identified existing least-privilege account to access network resource 170. Network resource proxy 120 may then match network identity 240 to the existing account from secret hub 160. In other embodiments, network resource proxy 120 may match network identity 240 to an existing account in secret hub 160 based on a list of permissions network identity 240 needs to access network resource 170 based on one or more access policy. For example, an existing account may be chosen that has the minimum least-privilege necessary to access and perform requested actions on network resource 170 based on a comparison of the list of permission levels that network identity 240 needs and the one or more access policy.

At step 430, network resource proxy 120 may retrieve matched account credentials from secret hub 160. Network resource proxy 120 may send a request to secret hub 160 to retrieve matched account credentials. Secret hub 160 may retrieve and decrypt the matched account credential and return the credential to network resource proxy 120 over a secured channel. A secured channel may be HTTPS with TLS, or any other secure channel connection.

Figure 5:
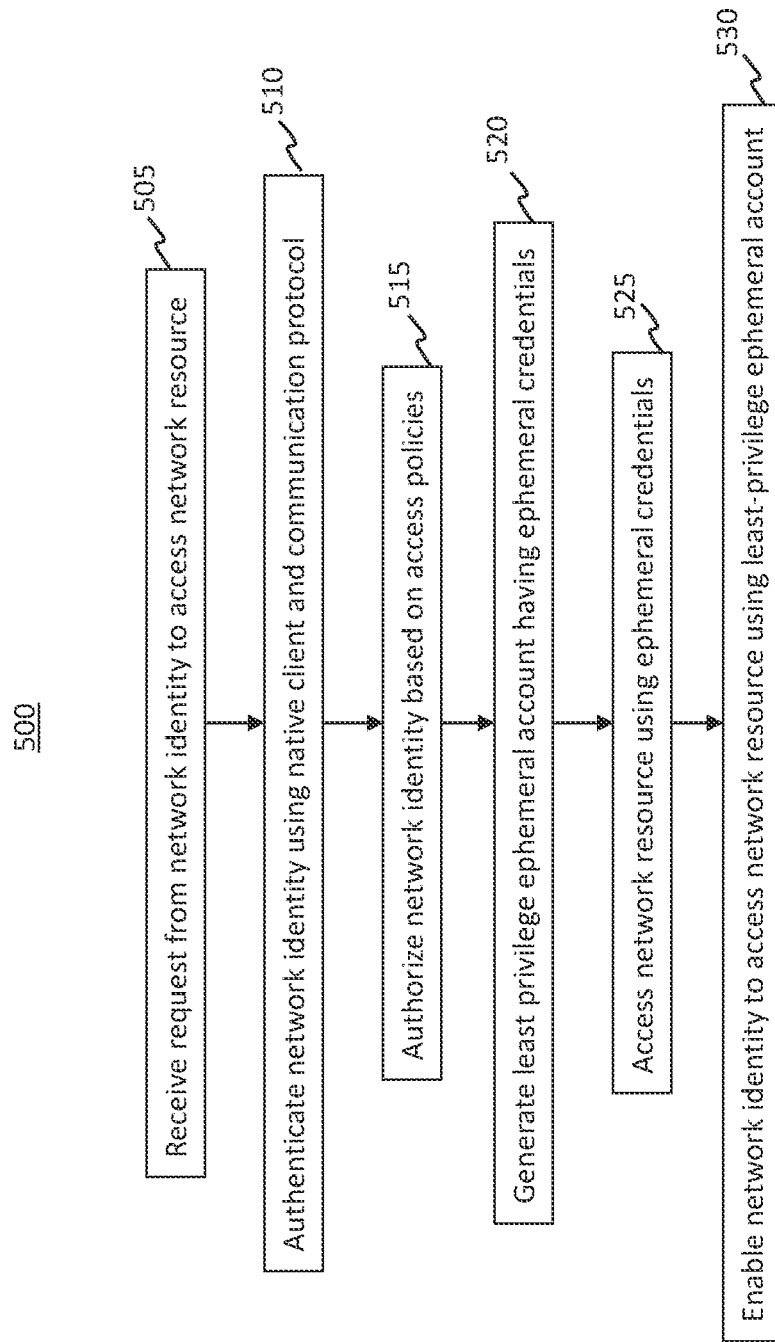
FIG. 5 is a flowchart showing an exemplary process for providing dynamic and least-privilege access to a network resource in accordance with disclosed embodiments.

FIG. 5 is a block diagram depicting an exemplary process 500 for providing dynamic and least-privilege access to a network resource. Step 505 of process 500 may include receiving a request from network identity 240 to access network resource 170. The requested access may include a request to perform any operation requiring privileged access to network resource 170. For example, the requested access may include a read request in which network identity 240 requests access to data associated with network resource 170 such as data stored in a memory, database of network resource 170, or any other stored data. In other embodiments, the requested access may comprise a request to perform one or more actions on the network resource 170. For example, the requested action may include a write request in which network identity 240 is requesting permission to modify, delete, or write data on network resource 170. Various other forms of requests may also be received in step 505.

At step 510, the network identity may be authenticated using a native client and communication protocol. For example, step 510 may correspond to step 315 for authenticating network identity 240, as described above with respect to FIG. 3. In some embodiments, authentication of network identity 240 may be performed using a personal account and a credential of network identity 240. A personal account of network identity 240 may be an account used by network identity 240 to access network resource 170. For example, a personal account of network identity 240 may comprise basic identifying information about network identity 240 and may include name, company name, account numbers, contact information, or any other information that may be used to identify network identity 240. The personal account of network identity 240 may be accessed using a credential of network identity 240. Credentials may include a username, password, access code, digital certificate, token, or any other form of information that can be used to authenticate network identity 240.

Authentication of network identity 240 may be done using a native client and communication protocol. A native client may include an application that is developed for use on the operating system it is running on. For example, a native client may include an MSSQL Client, CLI, VSCode, or any other application developed for use on the operating system being used by network identity 240. The native client may be configured to communicate transparently with network resource 170. For example, the native client may communicate in a manner that is transparent, or invisible, to network identity 240. Transparent communication between the native client and network resource 170 may be communication that does not create interruptions in network identity's 240 execution of the request for access to network resource 170. For example, transparent communication between the native client and network resource 170 may comprise exchanging information between the native client and network resource 170 in a manner that is not observable to network identity 240. Transparent communication between the native client and network resource may allow network identity 240 to access network resource 170 in the same manner in which network identity 240 would access a local resource. Native communication protocols may include rules and conventions for exchanging information between devices through a network or other media. For example, native communication protocols may be hypertext transfer protocol (HTTP), transmission control protocol (TCP), user datagram protocol (UDP), internet relay chat (IRC), or any other protocol suitable for transmitting information between systems.

Authenticating network identity 240 using an existing protocol may occur conditional on network identity 240 using a native client. Authentication of network identity 240 may occur through an agentless environment. For example, authentication of identity 240 may occur without any additional service, daemon, or process running in the background of computing device 130. In some embodiments, authentication of network identity 240 may not occur if network identity 240 uses a non-native client.

In some embodiments, using the native client and communication protocol may comprise identifying parameters to connect to a proxy and an identification of the network resource. A proxy may comprise a system, application, or other resource that provides an intermediary connection between network identity 240 and network resource 170. For example, a proxy may be configured to monitor and process requests and other communications between network identity 240 and network resource 170. A proxy may be a hardware proxy or a software proxy. For example, a hardware proxy may be between network identity 240 and network resource 170 to receive (e.g., intercept or directly receive), assess (e.g., parse communications headers, payload, etc.), send, and forward requests. A software proxy may be accommodated through a network resource provider or exist in the cloud. A proxy may be a forward proxy, a reverse proxy, a web proxy server, an anonymous proxy, a high anonymity proxy, a transparent proxy, a distorting proxy, or any other form of proxy that provides communication between network identity 240 and network resource 170.

Parameters to connect to a proxy may mediate connections between network identity 240 and network resource 170. For example, parameters to connect to a proxy may include a proxy server address, a username, password, or other credentials required to access the proxy, a port used to interact with the proxy, or any other configuration required to connect to a proxy. In some embodiments, parameters to connect to a proxy may indicate information such as the identity making the request to access network resource 170, a software application sending or receiving the request to access network resource 170, a type of network access request (such as to access, modify, delete, create, etc.), or various other types of parameters. An identification of a network resource may comprise parameters to connect to network resource 170. For example, identification of network resource 170 may include a source and destination address and port, protocol, domain name system information, IP address information, or any other connection information for identifying network resource 170.

At step 515, network identity 240 may be authorized based on one or more access policy. For example, step 515 may correspond to step 320 for authorizing network identity 240, as described with respect to FIG. 3. An access policy may comprise rules for accessibility of network resource 150. For example, an access policy may be any rule or requirement used to secure and restrict access to network resource 170. For example, an access policy may enforce when network identity 240 may access or perform actions on network resource 170. Access policy may create conditions that must be met by network identity 240 before network resource 170 may be accessed. For example, in some embodiments, an access policy may be based on a time restriction, a number of times network identity 240 may connect to network resource 170, or an idle time of network identity 240, etc. A time restriction may be a condition of an access policy that restricts access to network resource 170 based on the time the request to access network resource 170 is made. For example, the time restriction may restrict access to network resource 170 before a specified time or day, after a specified time of day, or within a range of specified times of day. The number of times network identity 240 may access network resource 170 may be a condition of an access policy that restricts how many times network identity 240 may access network resource 170. For example, the access policy may restrict access of network resource 170 to a specified number of times within a specified period of time. An idle time of network identity 240 may be a condition that governs how long network identity 240 may be inactive within network resource 170 before network identity 240 loses access to network resource 170. For example, the access policy may restrict an idle time to a specified duration of time. Activity within network identity 240 may refer to any user interaction with network resource 170 within the context of network resource 170. For example, activity may include a mouse click, a keyboard press, a command input, or any other interaction with network resource 170.

In some embodiments, an access policy may be based on one or more attributes related to a user machine, network identity 240, one or more network attributes, a requested action type, a requested resource type, or one or more environmental conditions. An attribute of a user machine may include specific attributes of computer device 130. For example, attributes of a user machine may include an operating system, a device ID, a serial number, a location, a host name, a directory ID, or any other identifier that defines attributes of a user machine. An access policy may allow or restrict access to network resource 170 based on attributes of the user machine used by network identity 240. An access policy based on one or more network attributes may include policies based on how the network of user device 130 may communicate with other networks. For example, a network attribute may include an IP address, a network interface name, a system name, or any other attribute of a network. An access policy may restrict or allow access to network resource 170 based on one or more attributes of the network used by network identity 240. An access policy may also allow or restrict access to network resource 170 based on the network identity 240 as discussed above. A requested action type may indicate the types of commands network identity 240 may request be performed on network resource 170. For example, a requested action type may include a request to add, delete, or modify data within network resource 170, a request to access network resource 170, a request to fetch data from network resource 170, or any other request to interact with network resource 170. An access policy may restrict or allow network identity 240 to interact with network resource 170 based on the type of action requested by network identity 240. A requested resource type may include the type of information network identity 240 has requested to access from network resource 170. A request resource type may include a type of database, a table, a scheme, a name, a variable, or any other resources within network resource 170. An access policy may allow or restrict access to network resource 170 based on the type of resource requested by network identity 240. An environmental condition may include any type of condition related to an environment of network identity 240. For example, environmental conditions may include weather, temperature, time of day, or any other conditions related to the environment of network identity 240. An access policy may allow or restrict access to network resource 170 based on the environmental conditions of network identity 240.

In some embodiments, an access policy may be based on an address of network resource 170, an instance name of network resource 170, a schema of network resource 170, a type of command, a table of network resource 170, a column of network resource 170, or a row of network resource 170. An address of network resource 170 may include a unique identifier to identify network resource 170 that may contain location information and make network resource 170 available for communication. For example, an address of network resource 170 may be a unique string of numbers, a name, or any other identifier of network resource 170. An access policy may restrict or allow access by network identity 240 to network resource 170 based on the address of network resource 170 that network identity 240 requests to access. An instance name may be a way to define a specific instance for a particular version of network resource 170. For example, an instance name may be used to connect to specific a network resource 170 and may be the target of a connection request from network identity 240. An access policy may restrict or allow network identity 240 to access network resource 170 based on the requested instance name. A schema of network resource 170 may define how data is organized within network resource 170. For example, a network resource schema may include table names, fields, data types, and relationships between these logical constraints. The schema of network resource 170 may organize data into separate entities and allow a single schema to be shared or accessed within another network resource. An access policy may control access to network resource 170 through permissions associated with each specific schema. Access policies based on types of commands may include the types of instructions network identity 240 may communicate to network resource 170 to perform specific task, functions, or queries. For example, a type of command may be a command to change the structure of network resource 170, a command to insert, update, or delete information within network resource 170, a command to fetch information from network resource 170, or any other interaction with network resource 170. An access policy may restrict or allow network identity 240 to perform commands on network resource 170 based on the type of command requested. A table of network resource 170 may be a collection of related data held in a table format within network resource 170. For example, a table of network resource 170 may include a set of data elements using a model of vertical columns and horizontal rows. An access policy may restrict or allow access to network resource 170 based on the table, column, or row requested by network identity 240.

At step 520 of process 500, a least-privilege ephemeral account having ephemeral credentials may be generated based on the one or more access policy. A least-privilege ephemeral account may refer to an account with restricted access rights. For example, a least-privilege ephemeral account generated for network identity 240 may be limited or restricted to allow network identity 240 to access only the elements of a network resource 170 that are needed to complete a specific task or request. The least-privilege ephemeral account may allow network identity 240 to access network resource 170 or run privileged commands on network resource 170 on a temporary and as-needed basis. The least-privilege ephemeral account may comprise provisioning privileged just-in-time access to network resource 170. For example, a least-privilege ephemeral account may elevate network identity 240 in real-time to provide a specific elevated privileged access to network resource 170 to perform a necessary task.

A least-privilege ephemeral account may have ephemeral credentials. Ephemeral credentials may be dynamically created credentials that are generated at the moment access to network resource 170 is needed. Ephemeral credentials may provide a token or certificate necessary for network identity 240 to access or perform a requested action on network resource 170. Ephemeral credentials may expire after a specified period of time and may not be refreshed after expiration.

Least-privilege ephemeral accounts may be generated based on one or more access policy. One or more access policy may contain the access level needed for network identity 240 to access or perform a requested action on network resource 170. A least-privilege ephemeral account may be generated by comparing the requested action to the access level contained in the one or more access policy. Generating a least-privilege ephemeral account may give network identity 240 the minimum necessary access level to perform a requested action on network resource 17.

In some embodiments, generating a least-privilege ephemeral account may be performed using a privileged account. A privileged account may be any account that has more privileges than an ordinary user. For example, a privileged account may be able to install or remove software, upgrade an operating system, modify a system or application configurations, perform security functions, or perform any actions on network resource 170 that an ordinary user is not permitted to do. A privileged account may also have administrative privileges to generate least-privilege ephemeral accounts.

In step 525 of process 500, network resource 170 may be accessed using ephemeral credentials. Network resource 170 may be accessed, for example, through a reverse tunnel from network resource 170 to network identity 240. Network identity 240 may then be connected to network resource 170 through the ephemeral credentials using a secure connection, such as a connection using a tabular data stream (TDS) protocol, or a similar connection protocol. While TDS is used by way of example, it is to be understood that various other forms of secure connections may be used, and the present disclosure is not limited to any particular connection protocol or configuration. An ephemeral role may be created on the tunnel which may be used as part of the connection between network resource 170 and network identity 240.

At step 530 of process 500, network identity 240 may be enabled to access network resource 170 using the least-privilege ephemeral account using the native client and communication protocol. Network identity 240 may use the ephemeral role created as part of the connection between network identity 240 and network resource 170 to access network resource 170. For example, network identity 240 may perform requested actions on network resource 170 using native client and communication protocols. The least-privilege ephemeral account may be used to exchange information between the network resource 170 using a native client as disclosed herein and network resource 170 in a manner that is not observable to network identity 240. Network identity 240 may use the least-privilege ephemeral account to communicate with network resource 170 to perform actions in the same manner in which network identity 240 would access a local resource.

In some embodiments, the least-privilege ephemeral account and the ephemeral credentials may be decommissioned after termination of a connection with network resource 170. The connection between network identity 240 and network resource 170 may be terminated in response to a command from (or based on) an access policy. For example, the connection may be terminated because an idle time of network identity 240 may exceed a specified duration of the access policy, network identity 240 may request to perform an action type that is not permitted under the access policy, network identity may request to access a table or schema of network resource 170 that is not accessible under the access policy, network identity 240 may voluntarily end the connection after completing the requested actions, a behavioral profile or pattern may be violated, or for any other reason that a connection may be terminated between network identity 240 and network resource 170.

Decommissioning the least-privilege ephemeral account and ephemeral credentials may comprise, for example, deleting the ephemeral account and ephemeral credentials. Decommissioning the least-privilege ephemeral account and ephemeral credentials in step 515 may correspond to step 370 for decommissioning ephemeral credentials, as described with respect to FIG. 3. For example, if network identity 240 attempted to connect to network resource 170 using the least-privilege ephemeral account and ephemeral credentials, access would be denied because the least-privilege ephemeral account and ephemeral credentials no longer exist. In some embodiments, decommissioning the least-privilege ephemeral account and ephemeral credentials may be accomplished by invalidating the ephemeral credentials, erasing a network certificate or token, or deprovisioning any other form of access to network resource 170 through the least-privilege ephemeral account and ephemeral credentials. After the least-privilege ephemeral account and ephemeral credentials are decommissioned, network identity 240 would have to repeat process 500 to access network resource 170 or to perform additional actions on network resource 170.

In some embodiments, the steps of process 500 may further comprise a resource discovery stage. A resource discovery stage may use a resource discovery protocol to locate and retrieve existing resources based on particular attributes across multiple domains. Resource discovery may discover resources that are in active or usable states or resources that have been terminated or otherwise made inactive. For example, resource discovery may be used to discover network resource 170 and other resources that may be accessed by network identity 240. After discovering resources through resource discovery, the attributes of the discovered resources may be determined. Attributes of discovered resources that may be determined may include server information, network information, block storage devices, network appliances, resource pools, operating systems, and any other attributes related to discovered resources.

In some embodiments, one or more access policies may be generated based on the discovery of the network resource integration. Attributes of the discovered resources may be used to determine the types of ephemeral accounts and ephemeral credentials that may be needed to allow network identity 240 to access the discovered network resources. Information, such as the operating system the network resource runs on, the server information of the network resource, or any other information relating to the network resource, may be needed to generate an ephemeral account and ephemeral credentials that are capable of accessing the specific network resource. Through the resource discovery stage, this information relating to network resources may be discovered and generated into an access policy that can be used to generate ephemeral accounts and ephemeral credentials to access the discovered network resources.

Figure 6:
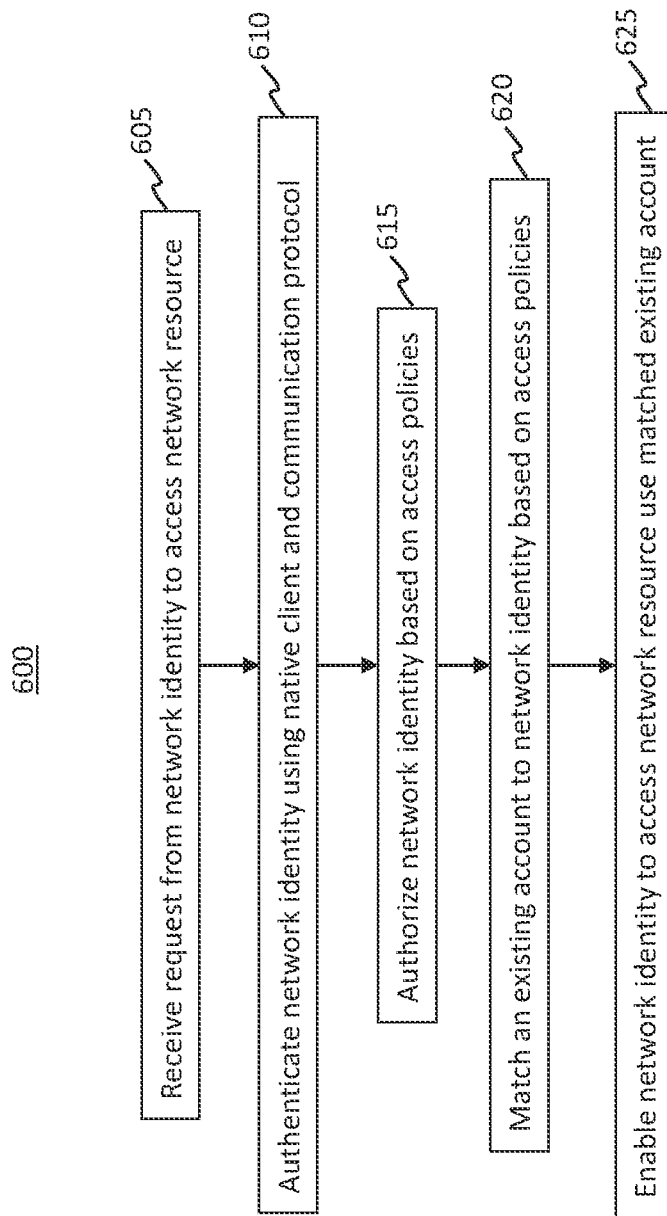
FIG. 6 is a flowchart showing an exemplary process for providing dynamic and least privilege access to a network resource using matched existing credentials in accordance with disclosed embodiments.

FIG. 6 is a block diagram depicting an exemplary process 600 for providing dynamic and least-privilege access to a network resource. At step 605, process 600 may include receiving a request from network identity 240 to access network resource 170. At step 610, process 600 may include authenticating network identity 240 using a native client and communication protocol, wherein the native client is configured for communicating transparently with network resource 170. At step 615, process 600 may include authorizing network identity 240 based on one or more access policy, the one or more access policy comprising rules for network resource accessibility. At step 625, process 600 may include enabling network identity 240 to access network resource 170 using the matched existing account, using the native client and communication protocol. Steps 605, 610, 615, and 625 of process 600 may correspond with steps 505, 510, 515, and 525 of process 500 as described herein.

At step 620, process 600 may include matching an existing account to network identity 240 based on one or more access policy. For example, step 620 may correspond to step 425 for matching an existing account to network identity 240, as described above with respect to FIG. 4. In other embodiments, matching an existing account to network identity 240 may comprise accessing a list of permitted existing accounts, accessing a list of permissions that network identity 240 needs to perform the requested actions, and choosing a least-privilege account from the list of permitted existing accounts based on the access policies. A list of permitted existing accounts may be accessed from secret hub 160. For example, secret hub 160 may contain a list of predefined permitted existing accounts that each network identity can use. Secret hub 160 may also contain a list of permissions that may be needed to perform various requested actions. For example, a list may contain various permissions levels preconfigured by network security administrators. The list may further contain the permission levels that are needed to perform specific requested tasks. A least-privileged account may be chosen from the list of permitted existing account that will allow network identity 240 to perform the requested actions on network resource 170 based on the access policies. The existing least-privileged account may then be matched to network identity 240 based on the match between the list of permitted existing accounts and the list of permission levels required to perform specified actions on network resource 170.

In some embodiments, process 600 may further include accessing a credential. A credential may be a short-lived credential, a long-lived credential, or any other type of credential that may be used to access network resource 170. For example, the credential may be a password, a token, an encryption key, a certificate, or any other form of verification that may be used to authorize access to network resource 170. In some embodiments, the credential may be an ephemeral credential as described herein. Ephemeral credentials may provide a token or certificate necessary for network identity 240 to access or perform a requested action on network resource 170 and may expire after a specified period of time without the ability to be refreshed. The credential may be accessed from secret hub 160 and used by network identity 240 to access network resource 170. In some embodiments, a credential for the existing least-privilege account may be fetched from a secure location. Fetching the credential may include accessing the credential from a secure location and sending the credential to be used by network identity 240. For example, a secure location may include secret hub 160, a credential manager, a credential vault, or any other location that may securely store credentials.

In some embodiments, a credential for the existing least-privilege account may be generated based on a strong account. A strong account may be an account with higher administrative privileges than an average account. For example, a strong account may be used to reset other account credentials, generate credentials for existing least-privilege accounts, or perform other functions that an average account is not permitted to perform. In some embodiments, a strong account may generate a credential for an existing least-privilege account.

In some embodiments, process 600 may include configuring access to an existing account to create credentials to an existing least-privilege account. Access to an existing account may be configured from secret hub 160. An existing account may be an account that is not decommissioned after use and can be used multiple times to access network resource 170. In some embodiments, an existing account may be a strong account as disclosed herein that may have privileges to create credentials to an existing least-privilege account. The created credentials may be a password, encryption key, token, certificate, or any other form of access credential for use in accessing network resource 170 by network identity 240 through an existing least-privilege account. An existing least-privileged account may be an account as disclosed herein that has the minimum level of privileges necessary for network identity 240 to perform requested actions on network resource 170.

In some embodiments, the request from network identity 240 may identify an account to connect with. As part of the request by network identity 240 to connect with network resource 170, network identity 240 may be required to identify the account with which to connect. The account which network identity 240 may identify to connect with may be an existing account on the permitted existing account list stored in secret hub 160. The account identified by network identity 240 may be compared with the list of permitted existing accounts in secret hub 160 to determine if the account is permitted to access and perform requested actions on network resource 170. If the account requested by network identity 240 is on the list of permitted existing accounts in secret hub 160, then network identity 240 may be able to use that account to access and perform requested actions on network resource 170. If the account is not on the list of permitted existing accounts in secret hub 160, then network identity 240 may not be permitted to use that account to access network resource 170.

Figure 7:
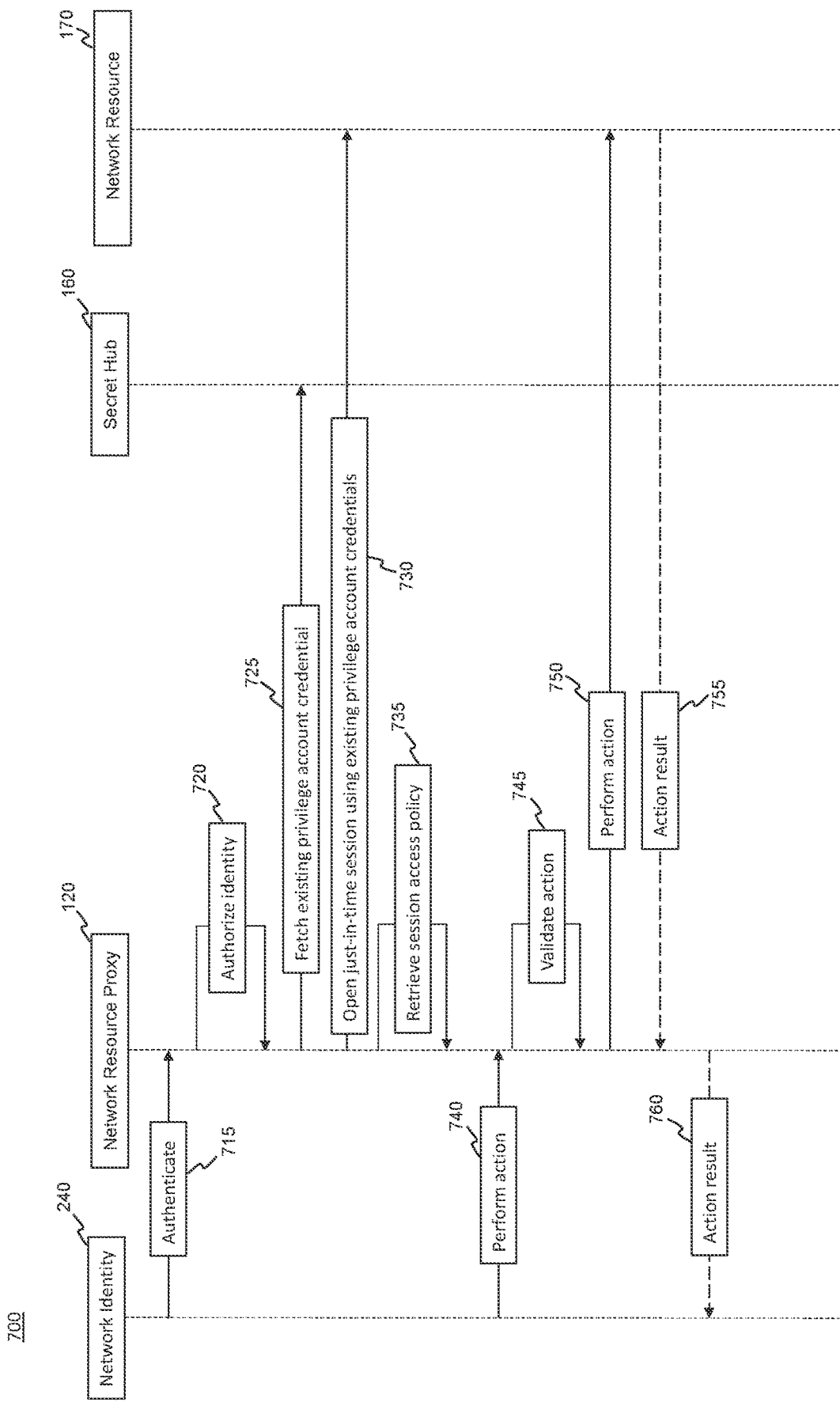
FIG. 7 is a block diagram showing an exemplary process for providing dynamic and monitored access to a network resource in accordance with disclosed embodiments.

FIG. 7 is a block diagram illustrating an exemplary process 700 for providing dynamic and monitored access to a network resource, consistent with disclosed embodiments. Process 700 may provide dynamic and monitored access to network resource 170 by network identity 240. At step 715, network resource proxy 120 may authenticate network identity 240. At step 720, network resource proxy 120 may authorize network identity 240. At steps 740 and 750, network identity 240 may perform an action on network resource proxy 120 and network resource proxy 120 may communicate the performed action to network resource 170. At steps 755 and 760, network resource 170 may communicate an action result to network resource proxy 120 and network resource proxy 170 may communicate the action result to network identity 240. Steps 715, 720, 740, and 750-760 may correspond with steps 315, 320, 340, and 345-355 of process 300, as described herein.

At step 725, network resource proxy 120 may fetch existing privilege account credentials from secret hub 160. Secret hub 160 may contain API keys, passwords, certificates, strong account credentials, and other sensitive data in a secure storage system, as disclosed herein. An existing privileged account credential may be a password, a token, an encryption key, a certificate, or any other form of verification that may be used to authorize access to network resource 170. For example, the privileged account credential may provide access to an account that has more privileges than a least-privilege account. An existing privilege account may be an account that is not decommissioned after use by network identity 240 and has privileges to perform certain actions on network resource 170 that other least-privilege accounts may not be permitted to perform. Network resource proxy 120 may fetch existing privilege account credentials from secret hub 160 through a privileged access manager. For example, network resource proxy 120 may send a request to secret hub 160 to fetch existing privilege account credentials. In response, secret hub 160 may retrieve the existing privilege account credentials, decrypt the protected existing privilege account credentials, and return the existing privilege account credentials to network resource proxy 120 over a secure channel.

At step 730, network resource proxy 120 may open a just-in-time session to access network resource 170 using existing privileged account credentials. A just-in-time session is a connection between network resource proxy 120 and network resource 170 that is created for a limited time to allow network identity 240 to access or perform a specific task on network resource 170, as disclosed herein. The existing privilege account credentials may be used to provision a one-time-use and just-in-time session between network proxy 120 and network resource 170. For example, network resource proxy 120 may create a reverse tunnel from network resource 170 to the customer environment which may connect network identity 240 to network resource 170 using the existing privilege account credentials.

At step 735, network resource proxy 120 may retrieve an access policy of the just-in-time session. In some embodiments, the access policy from the just-in-time session may be the same access policy as the one or more access policy used to authorize network identity 240, as disclosed herein. In other embodiments, the access policy from the just-in-time session may be a different access policy than the one or more access policy used to authorize network identity 240. The access policy of the just-in-time session may provide rules and requirements for actions that network identity 240 is permitted to perform on network resource 170. For example, the access policy may include rules that govern whether network identity 240 may modify, delete, or write data on network resource 170. Various other forms of requests may also be covered by access policies of the just-in-time session. Network resource proxy 120 may retrieve the access policy of the just-in-time session from a cached memory. Cached memory may be a volatile computer memory that may provide high-speed access to a processor storing the access policy. For example, cache memory may provide faster and easier access to the access policy than if the access policy was stored in a main memory or on a hard drive.

At step 745, network resource proxy 120 may validate an action requested by network identity 240. Validating an action may take place before the requested action is performed on network resource 170. Validating an action may comprise comparing the requested action to the access policy of the just-in-time session. For example, if the access policy allows network identity 240 to perform a requested action on network resource 170, then network resource proxy 120 may validate the action requested by network identity 240. If network resource proxy validates the requested action, it may then perform the requested action on network resource 170 as shown in step 750.

Figure 8:
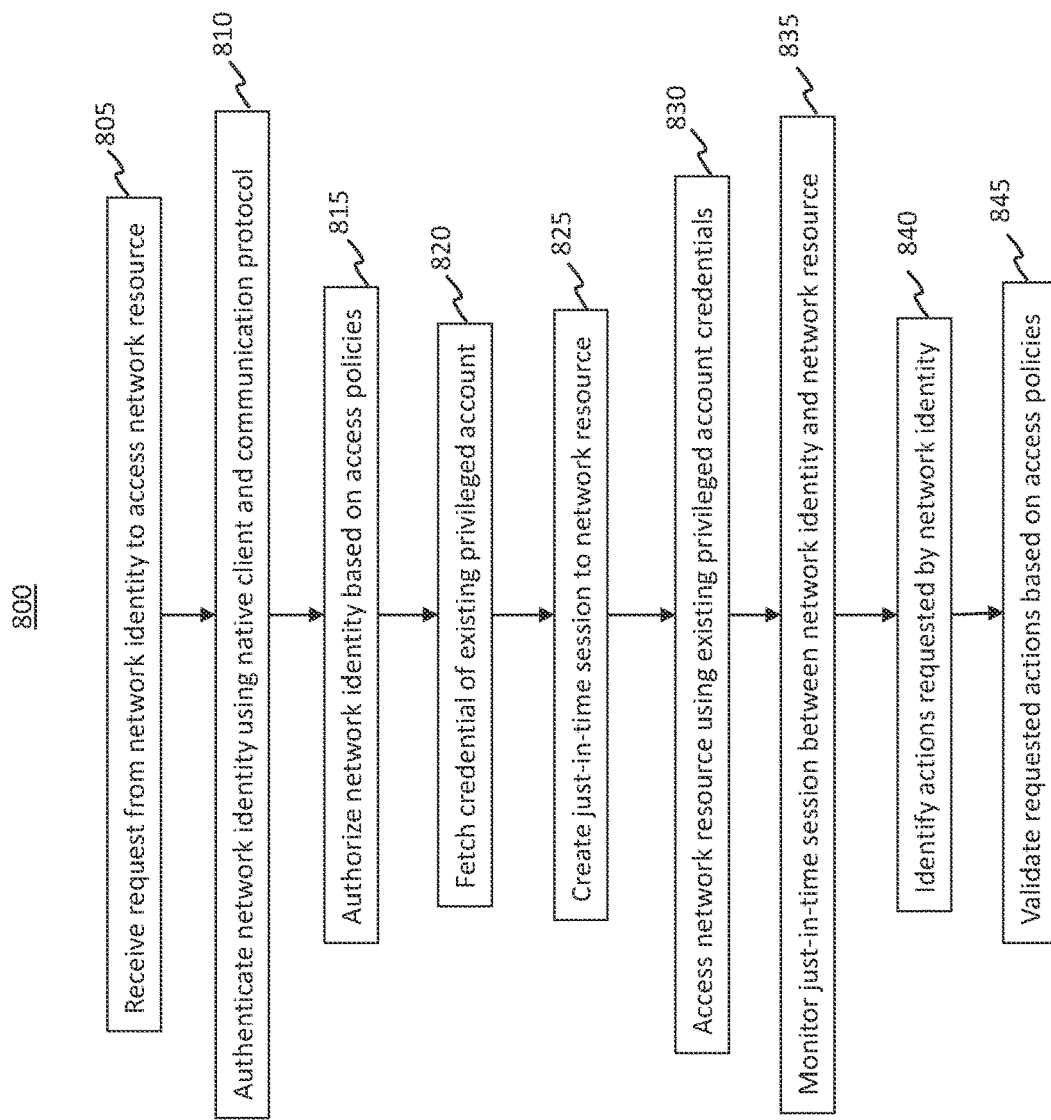
FIG. 8 is a flowchart showing an exemplary process for providing dynamic and monitored access to a network resource in accordance with disclosed embodiments.

FIG. 8 is a block diagram depicting an exemplary process 800 for providing dynamic and monitored access to a network resource. At step 805, process 800 may include receiving a request from network identity 240 to access network resource 170. At step 810, process 800 may include authenticating network identity 240 using a native client and communication protocol, wherein the native client is configured for communicating transparently with network resource 170. At step 815, process 800 may include authorizing network identity 240 based on one or more access policy, the one or more access policy comprising rules for network resource accessibility. At step 830, process 800 may include accessing network resource 170 using the credential of the existing privileged account. Steps 805, 810, 815, and 830 of process 800 may correspond with steps 505, 510, 515, and 525 of process 500 as described herein.

At step 820, process 800 may include fetching a credential of an existing privileged account. For example, step 820 may correspond to step 725 for fetching existing privileged account credentials, as described above with respect to FIG. 7. A credential of an existing privileged account may include any credential that may allow network identity 240 to access an existing privileged account 170, as disclosed herein. An existing privileged account may be an account stored in secret hub 160 that is not decommissioned or deprovisioned after use by network identity 240. For example, an existing privileged account may be an account stored in secret hub 160 that has permissions to access and perform one or more specific actions on network resource 170. In some embodiments, fetching a credential of an existing privileged account may comprise fetching the credential of an existing privileged account from a secure location. Fetching the credential may include accessing the credential from a secure location and sending the credential to be used by network identity 240. For example, a secure location may include secret hub 160, a credential manager, a credential vault, or any other location that may securely store credentials.

At step 825, process 800 may include creating a just-in-time session to network resource 170. For example, step 825 may correspond to step 730 for creating a just-in-time session to network resource 170, as described above with respect to FIG. 7. A just-in-time session to network resource 170 may be created by elevating a privilege level of network identity 240 to permit network identity 240 to access and perform specific actions on network resource 170. For example, by creating a just-in-time session, network resource proxy 120 may create a reverse tunnel from network resource 170 to the customer environment which may connect network identity 240 to network resource 170 and allow network identity 240 to perform one or more action on network resource 170.

At step 835, process 800 may include monitoring the just-in-time session between network identity 240 and network resource 170. Monitoring the just-in-time session may comprise recording the just-in-time session of network identity 240 with network resource 170 and providing real-time connection supervision. Monitoring the just-in-time session may include registering user actions such as mouse pointer movement, keystrokes, file transfers, actions modifying network resource 170, or any other action performed by network identity 240 in the just-in-time session. Monitoring the just-in-time session may allow system administrators or security officers to know in real-time if an access policy of a just-in-time session is being violated. In some embodiments, monitoring a just-in-time session may allow a system administrator or security officer to suspend or terminate active just-in-time sessions based on recorded actions performed by network identity 240 on network resource 170. Monitoring the just-in-time session may also include recording the network traffic with metadata, to allow a playback of the just-in-time session.

At step 840, process 800 may include identifying one or more action or command requested by network identity 240 within the native communication protocol. Network identity 240 may request to perform one or more action or command on network resource 170. For example, the requested action may include a write request in which network identity 240 is requesting permission to modify, delete, or write data on network resource 170, as disclosed herein. Network identity 240 may request one or more action or command within the native client communication protocol. Native communication protocols may include rules and conventions for exchanging information between devices through a network or other media, as disclosed herein. Native communication protocols may allow network identity 240 to request one or more action or command be performed on network resource 170 in the same manner in which network identity 240 would perform an action or command on a local resource. The one or more action or command may be identified. For example, the type of requested action or command may be identified, such as whether the requested action or command is to access network resource 170, modify, delete, or write data on network resource 170, or any other type of command involving network resource 170.

At step 845, process 800 may include validating the one or more requested action or command in real-time based on the one or more access policy. For example, step 845 may correspond to step 745 for validating an action, as described above with respect to FIG. 7. In some embodiments, validating the one or more requested action or command in real-time may comprise receiving a request from network identity 240 to perform an action through the just-in-time session, accessing the one or more access policy for the just-in-time session, and validating if the requested action is permitted based on the one or more access policy. Receiving a request from network identity 240 to perform an action through the just-in-time session may comprise receiving a request within a native communication protocol to read, write, modify, delete, or perform some other action on network resource 170 as disclosed herein. Accessing the one or more access policy for the just-in-time session may correspond to step 735, as described above with respect to FIG. 7. The access policy for the just-in-time session may be the same access policy used to authorize network identity 240 or may be a different access policy. For example, the access policy may include rules that govern whether network identity 240 may modify, delete, or write data on network resource 170. Various other forms of requests may also be covered by access policies of the just-in-time session. Network resource proxy 120 may retrieve the access policy of the just-in-time session from a cached memory, as disclosed herein. The requested action may be validated if the requested action is permitted based on the access policy.

The requested action may be compared to the access policy to determine if network identity 240 has the necessary permissions to perform the request action on network resource 170 under the access policy. If the access policy permits network identity 240 to perform the requested action on network resource 170, then the requested action may be validated. In some embodiments, validating the one or more requested action or command may occur before performing the one or more requested action or command on network resource 170. For example, network identity 240 may not be permitted to perform the requested action or command on network resource 170 until the requested action or command has been validated.

In some embodiments, the requested action may be performed on network resource 170 if the requested action is validated in step 845. Performing the action on network resource 170 may comprise communicating the requested action from network resource proxy 120 to network resource 170, as disclosed herein in steps 340 and 345 with respect to FIG. 3. In other embodiments, a message may be sent to network identity 240 through the just-in-time session in connection with the status of the requested action. For example, the message may be an error message, a message that the action could not be performed on network resource 170, a message that the requested action was performed on network resource 170, or any other message that reflects a status of the requested action. Network resource 170 may communicate the message to network resource proxy 120 and network resource proxy 120 may communicate the message to network identity 240.

In some embodiments, the operations may further comprise determining whether the requested action or command is permitted by the access policy and performing the requested action or command on network resource 170. Determining whether the requested action or command is permitted by the access policy may comprise comparing the requested action or command to the access policy. If the access policy contains rules that allows network identity 240 to perform the requested action or command on network resource 170, then it may be determined that network identity 240 may perform the requested action or command on network resource 170. The requested action or command may then be performed on network resource 170 by network resource proxy 120, as disclosed herein.

In some embodiments, it may be confirmed to network identity 240 that the requested action or command was performed on network resource 170. Performance of the requested action or command may be confirmed by sending a message to network identity 240 confirming that the requested action or command has been performed. In other embodiments, confirming to network identity 240 that the requested action or command was performed may comprise providing an action result to network identity 240.

As described herein, the disclosed techniques may allow for authentication and authorization of a network identity by authenticating an identity and generating least-privilege ephemeral credentials to access a network resource or matching an existing account to the network identity. In some embodiments, the disclosed techniques may further provide single sign-on (SSO) authentication processes for user 131. Accordingly, user 131 may initiate an SSO session using the various techniques described herein. User 131 may then continue to access various network resources without having to re-assert one or more authentication factors. For example, a network identity (e.g., user 131) may request to perform an action on a network resource using a native client and communication protocol, as described generally herein. Once authenticated and authorized, the network identity may receive a secret enabling access to one or more network resources. When accessing the one or more network resources at a later time, the network identity may provide the secret without having to re-authenticate. In some embodiments, the network identity may also be authenticated using data (e.g., metadata) associated with the network identity, as described further below. The data associated with the network identity may be used to enforce one or more SSO policies, in addition to validating the secret.

Figure 9:
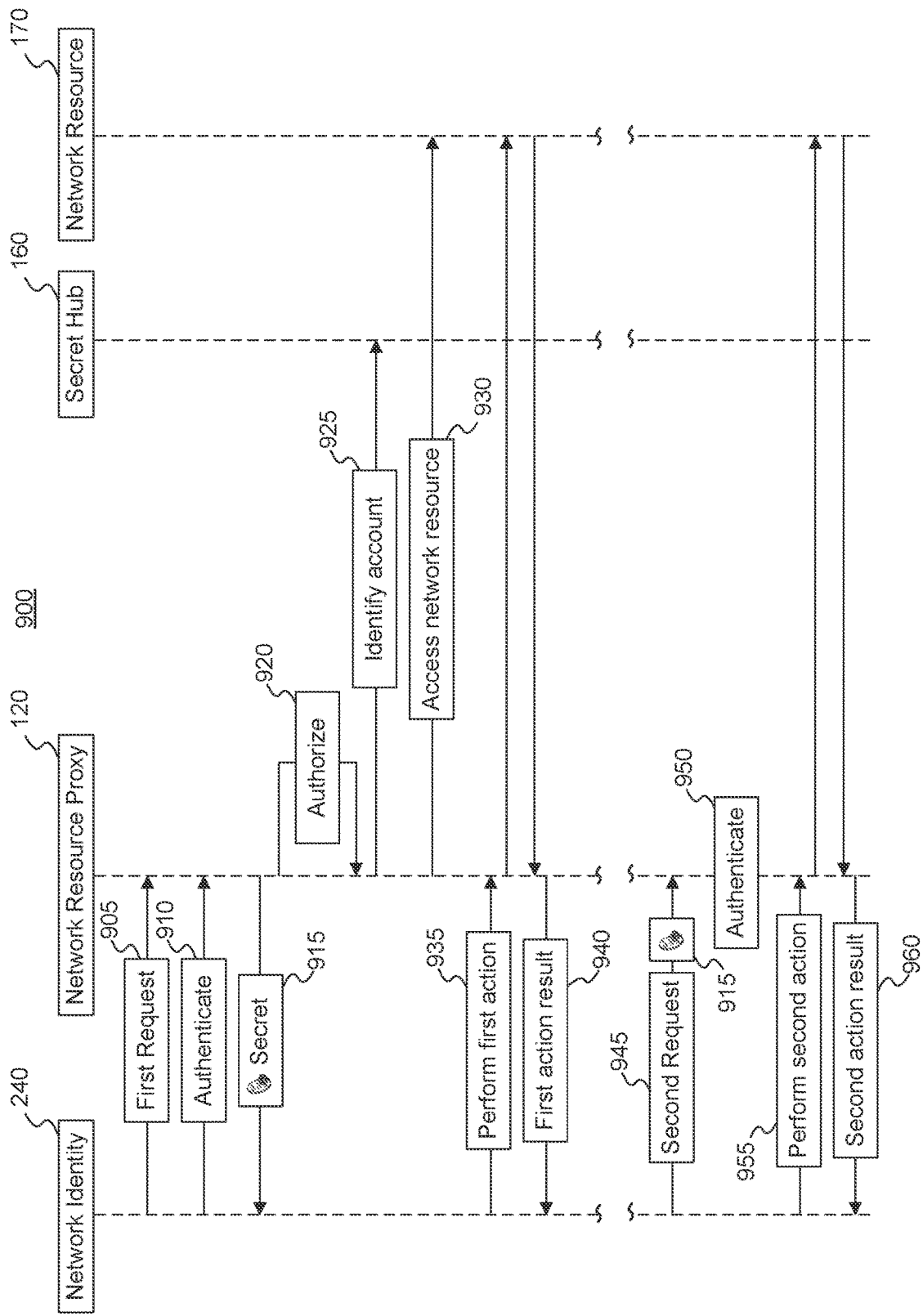
FIG. 9 is a block diagram depicting an exemplary process for providing dynamic and least-privilege access to a network resource, consistent with disclosed embodiments.

FIG. 9 is a block diagram depicting an exemplary process 900 for providing dynamic and least-privilege access to a network resource, consistent with disclosed embodiments. As described herein, a network identity 240 may request access to network resource 170. For example, as shown in FIG. 9, network identity 240 may submit a first request 905 to access network resource 170. First request 905 may be received by network resource proxy 120. Process 900 may include a step 910 in which network proxy 120 may authenticate network identity 240, and a step 920 in which network resource proxy 120 may authorize network identity 240 to access network resource 170. In some embodiments, steps 910 and 920 may correspond to steps 315 and 320 (and/or steps 415/420 or 715/720), respectively, as described in further detail above.

Process 900 may further include a step 925 of identifying an account for accessing network resource 170. Consistent with the disclosed embodiments, the account may be a least-privileged account having permissions to access and perform one or more specific actions on network resource 170. Accordingly, the account may be associated with a secret (i.e., a "second secret") for accessing network resource 170. In some embodiments, step 925 may include creating least-privilege ephemeral credentials, as described above with respect to step 330. Alternatively or additionally, step 925 may include matching an existing least-privilege account, as described above with respect to step 425. Step 930 may include accessing network resource 170, which may include opening a just-in-time session using ephemeral and/or existing account credentials (i.e., the "second secret"). In step 935, network identity 240 may perform a first action and, in step 940, may receive a first action result. Steps 935 and 940 may correspond to steps 340-355 (and/or steps 440-455 or 740-760) as described above.

Consistent with some embodiments of the present disclosure, process 900 may further include a step of providing a secret 915 (i.e., a "first secret") to network identity 240. Secret 915 may be a single sign-on secret enabling subsequent access to network resource 170. Secret 915 may be provided in various formats, such as a binary file, a textual file, binary data, textual data, a certificate, or any other forms of data that may be used to authenticate network identity 240. In some embodiments, secret 915 may include a file having a non-textual or non-readable format. Secret 915 may be provided to network identity 240 in various manners. In some embodiments, secret 915 may be provided through the native client. Accordingly, computing device 130 may not require a separate agent or software to enable a single sign-on session. In some embodiments, secret 915 may be provided automatically after the network identity is authenticated (i.e., based on step 910). Alternatively or additionally, secret 915 may be provided based on a command triggered by network identity 240. For example, the command may be a command to initiate a single sign-on session, which may be performed as part of the native communication protocol.

In some embodiments, process 900 may further include a step 945 of receiving a second request to access a network resource from network identity 240. In some embodiments, the second request may be a request to access the same network resource, in this case, network resource 170, as shown in FIG. 9. However, it is to be understood that the second request may not necessarily be a request to access the same network resource. Accordingly, the second request may be a request to access a different network resource (i.e., a "second network resource"). In step 950, process 900 may include authenticating network identity 240. The authentication in step 950 may be based on secret 915. As shown in FIG. 9, secret 915 may be provided to network resource proxy 120 in association with the second request. In some embodiments, secret 915 may be received as part of the second request. For example, secret 915 may be included in the second request in step 945, provided with the second request, transmitted separately with a reference to the second request, or the like. For example, the secret may be provided as part of a separate message or through a separate action. Alternatively or additionally, secret 915 may be provided through a separate session. For example, authentication 950 may include an interactive session with network resource 170 (or another network resource) and secret 915 may be provided through the interactive session.

Consistent with the disclosed embodiments, authentication step 950 may be performed based on secret 915. Accordingly, network identity 240 may be authenticated without requiring an additional secret (e.g., a credential) in step 950, thus allowing a single sign-on by network identity 240 for accessing one or more network resources. Process 900 may further include a step 955 for performing a second action and a step 960 for receiving a second action result by network identity 240, which may occur through network resource proxy 120 (similar to steps 935 and 940). Although not shown specifically in FIG. 9, the second action may be performed using an account and one or more second secret (e.g., credentials) associated with the account. Accordingly, process 900 may further include steps similar to steps 925 and 930 in association with the second request. In some embodiments, the action in step 955 may be performed using the same account and/or credentials associated with the action performed in step 935. Alternatively or additionally, the account and/or credentials may be different for each request. For example, as described in further detail above, the particular account and/or secret associated with the account may depend on the type of action requested to be performed.

In some embodiments, authentication step 950 may further be based on data associated with network identity 240. The data may include any data accessible to network resource proxy 120 via the native client. For example, the data may include a username of network identity 240, a group network identity 240 is associated with, a role network identity 240 is associated with, a type of authentication used for network identity 240, an IP address associated with the network identity, a type of the native client, a location of the network identity, a network provider for the network identity, a license associated with the network identity, a device identifier, or any other form of metadata that may at least partially represent the network identity, the native client, the second request, or the like. The data may be used to enforce one or more additional rules for accessing network resource 170 (or another network resource). For example, the network resource may be associated with one or more access policies, as described above. The access policy (or policies) may include one or more rules restricting or enabling access based on attributes of the data.

In some embodiments, the rules may define access based on a comparison of data received at different times (e.g., first data and second data). For example, first data may be received in association with the first request, and second data may be received in association with the second request. An access policy may define a rule requiring at least one aspect of the data associated with the first request to match at least one aspect of data associated with the second request. As one example, this may include ensuring an IP address of network identity 240 matches between the first request and second request. Accordingly, step 950 may include validating secret 915 based on a determination that the data associated with the first request at least partially matches the data associated with the second request. Alternatively or additionally, if the data does not match, at least one security action may be performed. For example, this may include revoking or at least temporarily invalidating secret 915 (thus requiring network identity 240 to re-authenticate. Various other security actions may include generating an alert, flagging network identity 240, suspending or terminating a least-privilege connection, requiring multi-factor authentication, monitoring or recording activity of network identity 240, limiting access rights of network identity, performing action-specific enforcement, for example blocking or preventing one or more actions (e.g., the first action or second action) or the like.

Figure 10:
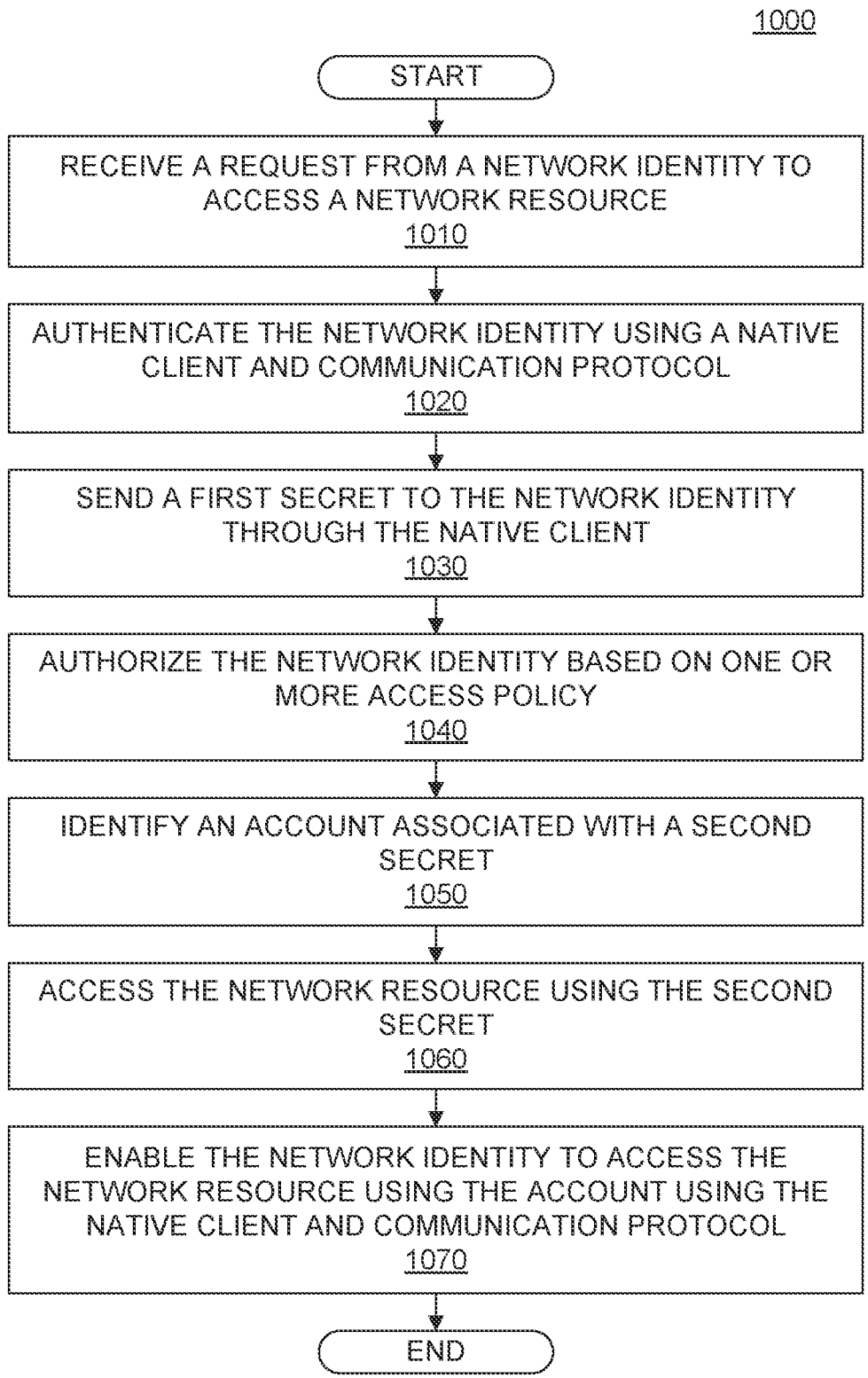
FIG. 10 is a flowchart showing an example process for providing agentless single sign on for native access to secure network resources, consistent with disclosed embodiments.

FIG. 10 is a flowchart showing an example process 1000 for providing agentless single sign on for native access to secure network resources, consistent with the disclosed embodiments. Process 1000 may be performed by at least one processor of a network resource proxy, which may correspond to processor 210, as described above. Alternatively or additionally, some or all of process 1000 may be performed by at least one separate processor, including a processor of another device or entity of system 100. It is to be understood that throughout the present disclosure, the term "processor" is used as a shorthand for "at least one processor." In other words, a processor may include one or more structures that perform logic operations whether such structures are collocated, connected, or dispersed. In some embodiments, a non-transitory computer readable medium may contain instructions that when executed by a processor cause the processor to perform process 1000. Further, process 1000 is not necessarily limited to the steps shown in FIG. 10, and any steps or processes of the various embodiments described throughout the present disclosure may also be included in process 1000, including those described above with respect to, for example, FIGS. 3-9.

In step 1010, process 1000 may include receiving a request from a network identity to access a network resource. For example, step 1010 may correspond to step 925 described above. The requested access may include a request to perform any operation requiring privileged access to network resource 170. For example, the requested access may include a read request in which network identity 240 requests access to data associated with network resource 170 such as data stored in a memory, database of network resource 170, or any other stored data. In other embodiments, the requested access may comprise a request to perform one or more actions on the network resource 170. For example, the requested action may include a write request in which network identity 240 is requesting permission to modify, delete, or write data on network resource 170.

In step 1020, process 1000 may include authenticating the network identity using a native client and communication protocol. In some embodiments, authentication of network identity 240 may be performed using a credential of network identity 240. For example, the credential may include a username, password, access code, digital certificate, token, or any other form of information that can be used to authenticate network identity 240. As described herein, the authentication may be performed using a native client and communication protocol. The authentication may thus be performed through an authentication process with the native client. In some embodiments, authenticating the network identity may include a multi-factor authentication, as described above.

In step 1030, process 1000 may include sending a first secret to the network identity through the native client. For example, this may include sending secret 915, as described above with respect to process 900. The first secret may include at least one of: a binary file, a textual file, binary data, textual data, or a certificate. In some embodiments, step 1030 may include sending the first secret to the network identity automatically after the network identity is authenticated. Alternatively or additionally, step 1030 may include sending the first secret to the network identity in response to a command triggered by the network identity as part of the native communication protocol.

In step 1040, process 1000 may include authorizing the network identity based on one or more access policy. For example, step 1040 may correspond to step 920 described above. The one or more access policy may comprise rules for accessibility of the at least one network resource. The access policy may create conditions that must be met by network identity 240 before network resource 170 may be accessed. For example, the access policy may be based on a time restriction, a number of times network identity 240 may connect to network resource 170, or an idle time of network identity 240, or various other factors, as described above.

In step 1050, process 1000 may include identifying, based on the one or more access policy, an account associated with a second secret. In some embodiments, step 1050 may include generating a least-privilege ephemeral account having ephemeral credentials, as described above. Alternatively or additionally, step 1050 may include matching an existing account to network identity 240 and/or fetching credentials of an existing account, as described above.

In step 1060, process 1000 may include accessing the at least one network resource using the second secret. For example, step 1060 may correspond to step 930 described above. In some embodiments, step 1060 may include opening a just-in-time session using the second secret (e.g., a privileged account credential, etc.) as described herein.

In step 1070, process 1000 may include enabling the network identity to access the at least one network resource using the account using the native client and communication protocol. For example, step 1070 may include performing a first action and receiving a first action result, as described above with respect to steps 935 and 940.

In some embodiments, process 1000 may further include receiving a second request from the network identity to access the network resource or an additional network resource. For example, process 1000 may include receiving a second request as described above with respect to step 945. Process 900 may further include authenticating the network identity using the native client or a second native client as described above with respect to step 950. Accordingly, authenticating the network identity may include receiving the first secret from the network identity. In some embodiments, the first secret may be received as part of the second request. Alternatively or additionally, the authentication may be part of an interactive session with the network resource or the additional network resource and the first secret may be received through the interactive session, as described above. In some embodiments, the second request may not necessarily be associated with the same account or same second secret as the first request. For example, access to the at least one of the network resource or the additional network resource according to the second request is associated with an additional account. The additional account may be different from the account associated with the second secret. As another example, access to the at least one of the network resource or the additional network resource according to the second request may be associated with an additional secret. The additional secret may be different from the second secret.

In some embodiments, additional data may be used to authenticate the network identity in association with the second request. For example, authenticating the network identity using the native client or the second native client may further comprise receiving data associated with the network identity. As described above, the data may include at least one of a username of the network identity, a group the network identity is associated with, a role the network identity is associated with, a type of authentication used for the network identity, an IP address associated with the network identity, a type of the native client, a location of the network identity, a network provider for the network identity, a license associated with the network identity, or a device identifier, etc. Authenticating the network identity using the native client or the second native client may further include using the data to enforce additional rules for accessibility of the network resource or the additional network resource, as described above.

In some embodiments, the network identity may be authorized based on a comparison of data. For example, process 1000 may include receiving from the network identity second data associated with the network identity, comparing the data to the second data, and authorizing the network identity based on the comparison. Based on a determination that the data at least partially matches the second data, process 1000 may include validating the first secret. Based on a determination that the data does not match the second data, process 1000 may include performing at least one security action, as described above.

As described herein, a network identity may be authorized to access a network resource based on an access policy. As described above, the access policy may include rules for accessibility of the network resource. For example, network resource 170 may be associated with an access policy defining permissions required to perform a requested action on network resource 170. In some embodiments, the disclosed embodiments may allow for an additional authorization layer based on an additional set of rules. For example, the additional set of rules may include rules not natively supported by network resource 170. These additional rules may be included in the same access policy as the rules supported by the network resource, or the additional rules may be included in an additional access policy. Accordingly, the additional rules may provide an additional layer of security and thus may allow enhanced authorization of a network identity. In some embodiments, the additional rules may be enforced in real time by analyzing data as it is transferred according to the native communication protocol.

Figure 11:
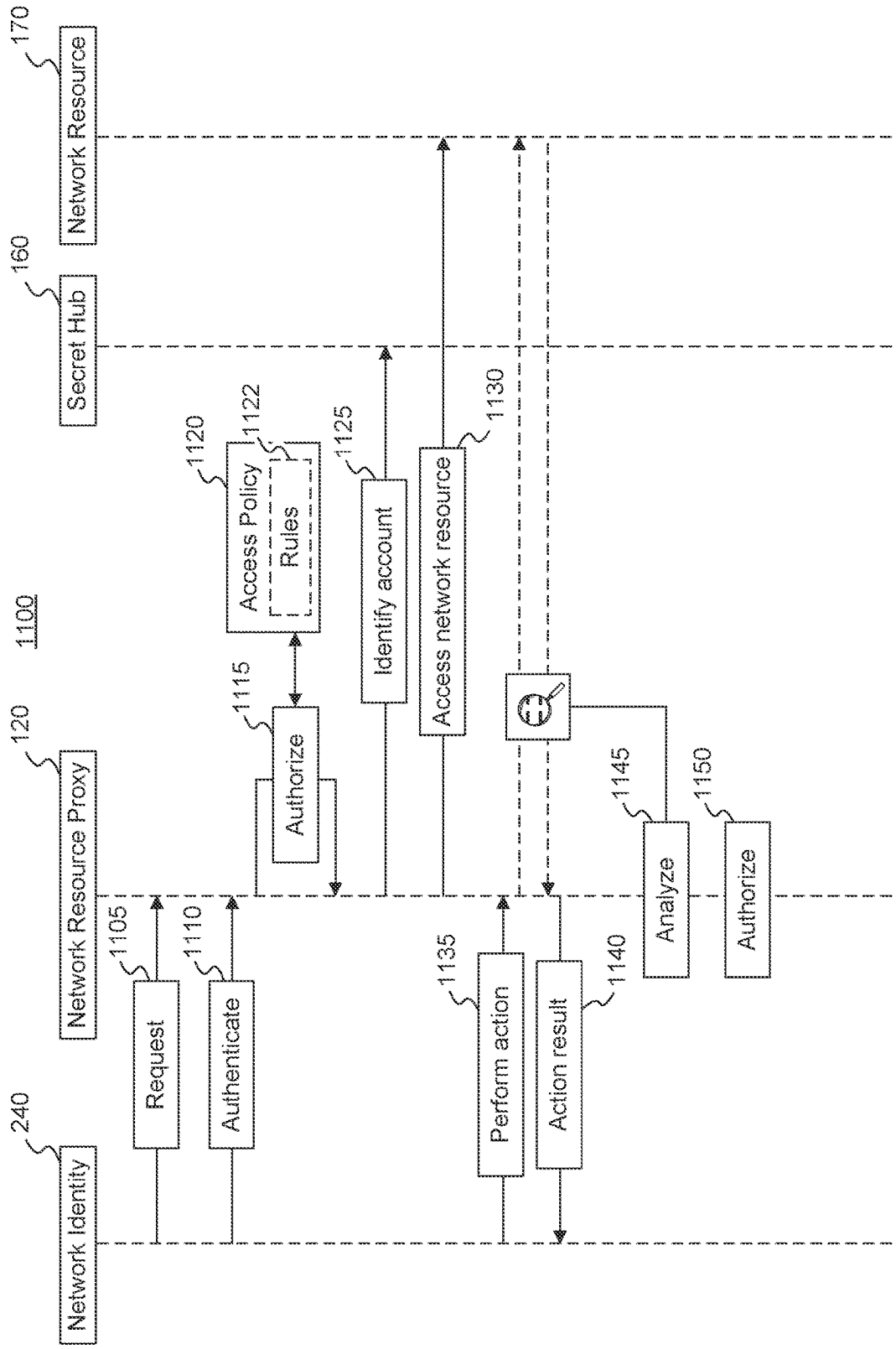
FIG. 11 is a block diagram depicting an exemplary process for providing native agentless authorization for network resources, consistent with disclosed embodiments.

FIG. 11 is a block diagram depicting an exemplary process 1100 for providing native agentless authorization for network resources, consistent with the disclosed embodiments. As described herein, a network identity 240 may request access to network resource 170. For example, as shown in FIG. 11, network identity 240 may submit a request 1105 to access network resource 170. Request 1105 may be received by network resource proxy 120. Process 1100 may include a step 1110 in which network proxy 120 may authenticate network identity 240, and a step 1115 in which network resource proxy 120 may authorize network identity 240 to access network resource 170. In some embodiments, steps 1110 and 1115 may correspond to steps 315 and 320 (and/or steps 415/420 or 715/720), respectively, as described in further detail above.

Process 1100 may further include a step 1125 of identifying an account for accessing network resource 170. Consistent with the disclosed embodiments, the account may be a least-privileged account having permissions to access and perform one or more specific actions on network resource 170. Accordingly, the account may be associated with a secret (e.g., a credential) for accessing network resource 170. In some embodiments, step 1125 may include creating least-privilege ephemeral credentials, as described above with respect to step 330. Alternatively or additionally, step 1125 may include matching an existing least-privilege account, as described above with respect to step 425. Step 1130 may include accessing network resource 170, which may include opening a just-in-time session using ephemeral and/or existing account credentials. In step 1135, network identity 240 may perform a first action and, in step 1140, may receive a first action result. Steps 1135 and 1140 may correspond to steps 340-355 (and/or steps 440-455 or 740-760) described above.

Consistent with the disclosed embodiments, authorizing the network identity may be performed based on at least one access policy 1120. Accordingly, step 1115 may include authorizing network identity 240 based on access policy 1120. As described above, access policy 1120 may include various rules defining requirements to perform a requested action on network resource 170. For example, these rules may be applied to various data associated with network identity 240 that may be ascertained from request 1105 to determine whether network identity 240 is authorized to access network resource 170. In some embodiments, the rules may be rules that are natively supported by network resource 170. For example, the natively supported rules may include privilege level requirements for accessing certain data, restrictions on which commands may be performed, restrictions on which resources may be accessed, general types of permissions allowed (e.g., read, write, update, etc.), permissions specific to one or more files or resources (e.g., defining a table as read-only, defining a database as having write permissions), restrictions on particular applications (i.e., defining particular applications that may be accessed), defining devices associated with a target resource (e.g., drives, network adapters, GPU access, etc.), or various other rules that may be defined in association with a network resource.

In some embodiments, access policy 1120 may further include additional rules 1122 not natively supported by network resource 170. For example, rules 1122 may require analyzing types of data associated with network identity 240, request 1105, the action requested in step 1135, and/or the result provided in step 1140. Accordingly, rules 1122 may be supplemental rules to provide an additional layer of security over the natively supported rules of access policy 1120. In some embodiments, rules 1122 may be included in the same access policy as the natively supported rules. For example, access policy 1120 may include both natively supported rules and additional rules 1122. Alternatively or additionally, at least some of additional rules 1122 may be included in a separate access policy from the natively supported rules. In some embodiments, rules 1122 may be defined by a user or an organization. For example, an organization may define additional security requirements for accessing network resource 170, beyond those typically define for accessing network resource 170.

As indicated above, at least some of rules 1122 may pertain to data requested from network resource 170. For example, process 1100 may include a step 1145 of analyzing data transferred between network identity 240 and network resource 170. For example, in step 1135, network identity 240 may perform an action via network resource proxy 120, and network resource proxy 120 may forward the request to network resource 170. Prior to forwarding the action request, network resource proxy 120 may apply rules 1122 to the request to ensure compliance with access policy 1120. Similarly, in step 1140, network resource proxy 120 may receive a result of the requested action from network resource 170 and forward the request to network identity 240. Prior to forwarding the result, network resource proxy 120 may apply rules 1122 to the result to ensure compliance with access policy 1120.

Rules 1122 may analyze various types of data associated with a requested action and the result of the action. In some embodiments, a requested action may be to access or edit data stored in a data structure, such as a database, a table, an array, or various other tabular formats. In some embodiments, rules 1122 may pertain to particular attributes of the action or result in association with the data structure. For example, rules 1122 may include a row-level security defining rules for one or more particular rows in a data structure, or a column-level security defining rules for one or more particular columns in a data structure. These row- or column-specific rules may restrict (e.g., based on permissions, etc.) accessing or editing certain rows or columns. As another example, rules 1122 may include a rule limiting the number of rows or columns that may be accessed and/or affected by network identity 240 (and/or other network identities). Similarly, a rule may be defined limiting the number of tables that may be accessed (e.g., within a particular query, etc.). Another example rule associated with a data structure may include a column or row hiding rule. For example, this may include a rule defining whether certain rows or columns may be hidden, whether hidden rows or columns may be accessed, or other rules associated with column or row hiding. The various rules defined herein may be query-specific (e.g., the number of rows that may be accessed in any one query), or based on other conditions. For example, the rules may be applied for each individual identity (e.g., limiting the number of rows an identity may access), over a particular time period, within the same session, or any combination thereof.

In some embodiments, rules 1120 may define a type or quantity of data accessible at network resource 170. For example, rules 1120 may define a number of queries of a specific type for network resource 170. In some embodiments, the rules may define a bandwidth of data a request or connection may take up. For example, rules 1120 may limit an amount of CPU\RAM that the connection or query consumes, an execution time of a specific query or connection, a size of data requested, a number of resources that may be accessed, or the like. As another example, rules 1120 may include time-based restrictions, for example, limiting times of day, days of the week, or other time-based rules defining when network resource 170 (or certain data stored therein) may be accessed.

In some embodiments, process 1100 may further include a step 1150 for authorizing individual actions or action results. For example, authorization step 1150 may include determining whether data associated with an action or result violates one or more of rules 1122. If the action or result does not violate rules 1122, the action may proceed as described herein. However, if the action or result does violate rules 1122, network resource proxy 120 may perform one or more security actions. In some embodiments, the security action may include denying an action from being performed or denying a result of an action to be provided to network identity 240. Alternatively or additionally, the security action may include requiring a new authentication of network identity 240, updating access policy 1120 (e.g., adding, removing, or modifying rules 1122), reissuing a secret (e.g., a credential), updating event log, generating an alert, or the like.

Figure 12:
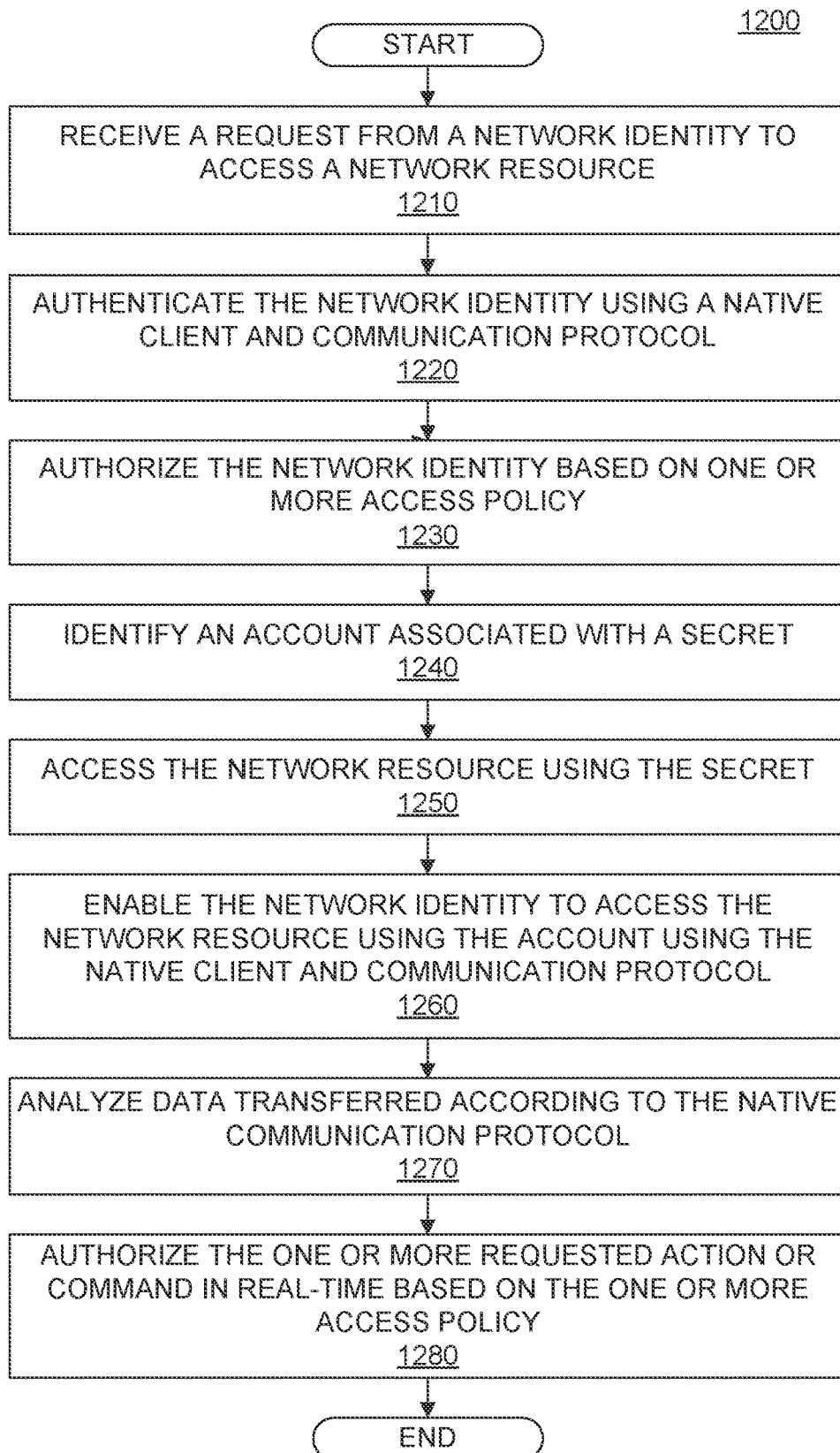
FIG. 12 is a flowchart showing an example process for providing native agentless authorization for network resources, consistent with disclosed embodiments.

FIG. 12 is a flowchart showing an example process 1200 for providing native agentless authorization for network resources, consistent with disclosed embodiments. Process 1200 may be performed by at least one processor of a network resource proxy, which may correspond to processor 210, as described above. Alternatively or additionally, some or all of process 1200 may be performed by at least one separate processor, including a processor of another device or entity of system 100. In some embodiments, a non-transitory computer readable medium may contain instructions that when executed by a processor cause the processor to perform process 1200. Further, process 1200 is not necessarily limited to the steps shown in FIG. 12, and any steps or processes of the various embodiments described throughout the present disclosure may also be included in process 1200, including those described above with respect to, for example, FIGS. 3-11.

In step 1210, process 1200 may include receiving a request from a network identity to access a network resource. For example, step 1210 may correspond to step 1105 described above. The requested access may include a request to perform one or more actions on the network resource. For example, the requested access may include a read request in which network identity 240 requests access to data associated with network resource 170 such as data stored in a memory, database of network resource 170, or any other stored data. In other embodiments, the requested access may comprise a request to perform one or more actions on the network resource 170. For example, the requested action may include a write request in which network identity 240 is requesting permission to modify, delete, or write data on network resource 170.

In step 1220, process 1200 may include authenticating the network identity using a native client and communication protocol. As described above, the native client may be configured for communicating transparently with the network resource. In some embodiments, authentication of network identity 240 may be performed using a credential of network identity 240. For example, the credential may include a username, password, access code, digital certificate, token, or any other form of information that can be used to authenticate network identity 240. As described herein, the authentication may be performed using a native client and communication protocol. The authentication may thus be performed through an authentication process with the native client. In some embodiments, authenticating the network identity may include a multi-factor authentication, as described above.

In step 1230, process 1200 may include authorizing the network identity based on one or more access policy. For example, step 1230 may correspond to step 1115 described above. In some embodiments, authorizing the one or more requested action or command may be performed transparently to the network resource. The one or more access policy may comprise rules for accessibility of the at least one network resource. Further, the one or more access policy may include an additional set of rules providing an authorization layer not natively supported by the network resource. In some embodiments, the additional set of rules and the rules for accessibility may be included in different access policies. For example, the one or more access policy may include at least a first access policy and a second access policy, the first access policy including the rules for accessibility of the network resource, and the second access policy including the additional set of rules. Alternatively or additionally, the additional set of rules and the rules for accessibility may be included in the same access policy. For example, the one or more access policy includes an access policy including at least some of the rules for accessibility of the network resource and at least some of the additional set of rules.

In some embodiments, the additional set of rules may include at least one rule associated with a data structure. For example, the at least one rule associated with a data structure may include at least one of: a row-level security, a column-level security, a column hiding, a number of tables associated with a query, a number of rows that are affected within a specific query or as part of the full connection, or a number of fetched rows. Alternatively or additionally, the additional set of rules may include at least one of: a number of queries of a specific type, a number of permitted resources, an execution time of a specific query, an amount of CPU RAM that the connection consumes, a size of the data, a number of queries within a period of time, or a time limitation, etc., as described above.

In step 1240, process 1200 may include identifying an account having a secret, based on the one or more access policy. For example, step 1240 may correspond to step 1125 as described above. In some embodiments, step 1240 may include generating a least-privilege ephemeral account having ephemeral credentials. Alternatively or additionally, step 1240 may include matching an existing account to network identity 240 and/or fetching credentials of an existing account.

In step 1250, process 1200 may include accessing the network resource using the secret. For example, step 1250 may correspond to step 1130 described above. In some embodiments, step 1250 may include opening a just-in-time session using the secret (e.g., a privileged account credential, etc.) as described herein.

In step 1260, process 1200 may include enabling the network identity to access the network resource using the account using the native client and communication protocol. For example, step 1260 may include performing an action and receiving an action result, as described above with respect to steps 1135 and 1140.

In step 1270, process 1200 may include analyzing data transferred according to the native communication protocol. For example, step 1270 may correspond to step 1145 described above. Analyzing the transferred data may include identifying one or more action or command requested by the network identity within the native communication protocol. For example, step 1270 may include analyzing an action requested to be performed on network resource 170 and/or analyzing a result of the action provided by network resource 170. Accordingly, analyzing the data transferred according to the native communication protocol may include receiving, from the network identity, an indication of the one or more action or command requested by the network identity, and analyzing the indication of the action based on the additional set of rules. Alternatively or additionally, analyzing the data transferred according to the native communication protocol may include receiving, from the network resource, a result of the one or more action or command, and analyzing the result of the action based on the additional set of rules.

In step 1280, process 1200 may include authorizing the one or more requested action or command in real-time based on the one or more access policy. For example, step 1280 may include enforcing a request to perform one or more actions on the network resource based on the additional set of rules. In some embodiments, process 1200 may further include, based on a determination that the requested action or command violates at least one of the additional set of rules, performing at least one security action. For example, the at least one security action may include revoking the authentication of the network identity, preventing the requested action or command, or various other security actions, as described above. In some embodiments, process 1200 may further include allowing limited advanced access to the network resource based on the additional set of rules. Limited advanced access may include allowing access to the network resource in some limited capacity (e.g., on a certain portion of the data, for certain actions, for a certain duration, etc.) that would not otherwise be allowed based on the rules for accessibility of the network resource. In some embodiments, allowing limited advanced access may not adjust the network resource. In other words, the limited advanced access may not significantly alter data stored on the network resource.

As described herein, a network identity may be authorized to access a network resource. For example, network identity 240 may request to perform one or more actions on network resource 170, which may be authorized by network resource proxy 120. According to some embodiments, network resource proxy 120 may be configured to generate a new entity associated with a network resource and may adapt the request to be performed using the new entity. The new entity may be configured to provide at least one enhancement relative to the request being performed on the original network identity. For example, in some embodiments the new entity may be a duplicate of at least a portion of the original network identity, such that the request is performed on the duplicated portion of the original network identity. This may provide increased security by reducing a risk that the original network identity may be altered or subject to an attack. In some embodiments this may further improve the efficiency of performing the request. For example, only data relevant to the request may be included in the new entity, thus reducing the amount of data that would need to be accessed by the request.

In some embodiments, the new entity may include an enhancement or supplement to the original network identity. The enhancement may be generated to improve an efficiency or other aspect of the request. For example, the enhancing feature may be an index classifying portions of the original network identity into various categories. The index may be used to identify relevant information in the original network identity more efficiently. As another example the enhancing feature may include a primary key or foreign key, which may define relationships between tables in a relational database. Various other example enhancements are described below. Accordingly, by generating the new entity, the efficiency of performing a query within the system may be improved.

Figure 13:
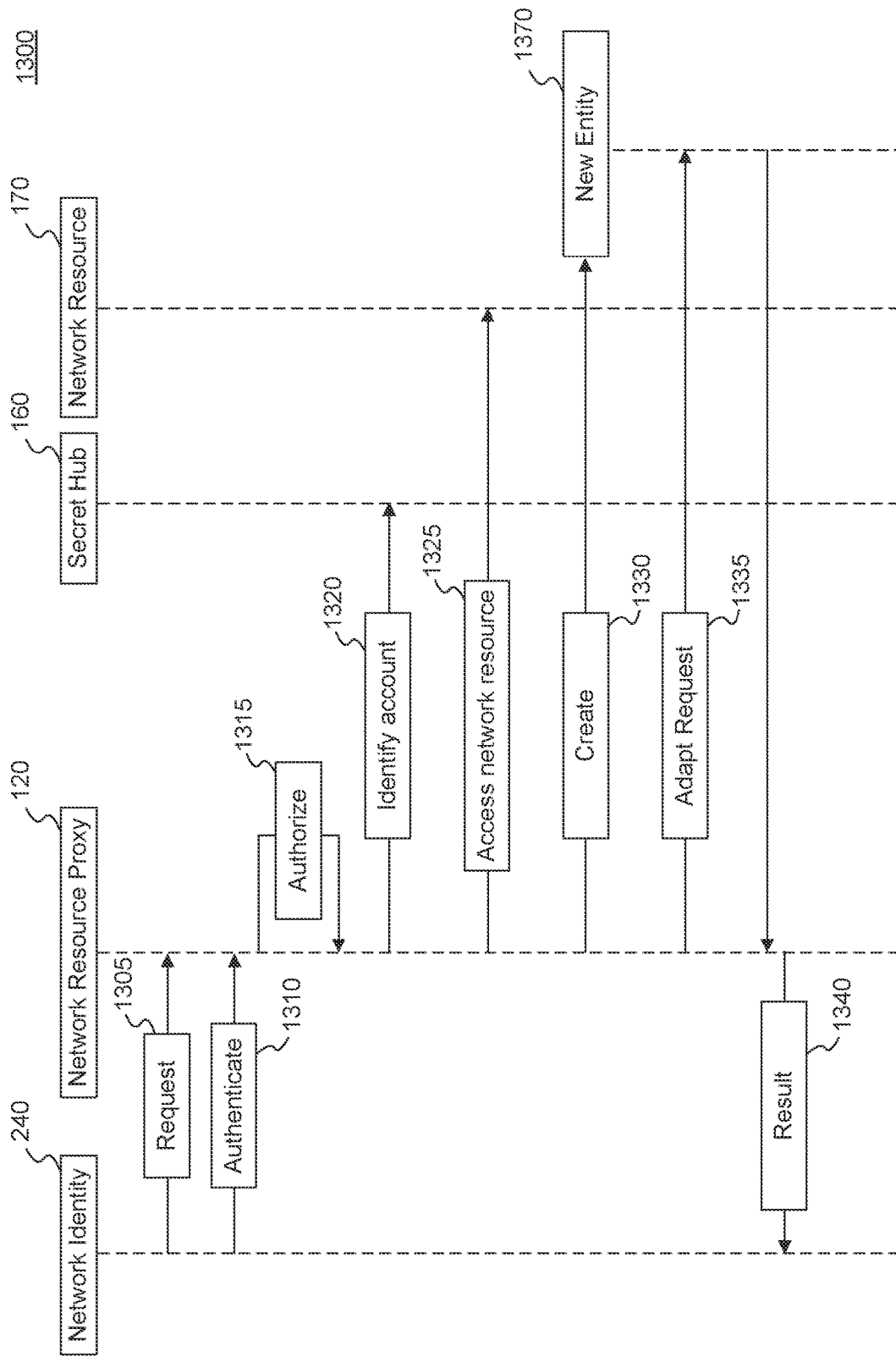
FIG. 13 is a block diagram depicting an exemplary process for providing agentless efficient queries for native network resource connections, consistent with disclosed embodiments.

FIG. 13 is a block diagram depicting an exemplary process 1300 for providing agentless efficient queries for native network resource connections, consistent with disclosed embodiments. As described herein, a network identity 240 may request access to network resource 170. For example, as shown in FIG. 13, network identity 240 may submit a request 1305 to access network resource 170. Request 1305 may be received by network resource proxy 120. Process 1300 may include a step 1310 in which network proxy 120 may authenticate network identity 240, and a step 1315 in which network resource proxy 120 may authorize network identity 240 to access network resource 170. In some embodiments, steps 1310 and 1315 may correspond to steps 315 and 320 (and/or steps 415/420 or 715/720), respectively, as described in further detail above.

Process 1300 may further include a step 1320 of identifying an account for accessing network resource 170. Consistent with the disclosed embodiments, the account may be a least-privileged account having permissions to access and perform one or more specific actions on network resource 170. Accordingly, the account may be associated with a secret (e.g., a credential) for accessing network resource 170. In some embodiments, step 1320 may include creating least-privilege ephemeral credentials, as described above with respect to step 330. Alternatively or additionally, step 1320 may include matching an existing least-privilege account, as described above with respect to step 425. Step 1325 may include accessing network resource 170, which may include opening a just-in-time session using ephemeral and/or existing account credentials.

Consistent with the disclosed embodiments, process 1300 may include a step 1330 for creating a new entity 1370, which may be used to perform request 1305. For example, request 1305 may be performed on new entity 1370 instead of network resource 170, or may be performed using new entity 1370 as an enhancement to network resource 170. New entity 1370 may be configured such that a result of performing the action using new entity 1370 may produce the same result as if the result were performed on the original network identity 240. Process 1300 may further include a step 1335 for adapting request 1305 to use new entity 1370 instead of or in addition to network resource 170. Step 1335 may include altering at least one aspect of request 1305 to generate an adapted request, as described further below.

New entity 1370 may take various forms, consistent with the present disclosure. In some embodiments, new entity 1370 may be a separate network resource. For example, new entity 1370 may be a new network resource that may include at least a portion of the data of network identity 240. Accordingly, performing the requested action on new entity 1370 may produce the same or similar result as if the request were performed on network resource 170. In some embodiments, this may include generating a network resource duplicating at least a portion of network resource 170. In some embodiments, step 1330 may include duplicating network resource 170 entirely. Alternatively or additionally, step 1330 may include duplicating a portion of network resource 170. In some embodiments, the portion of network resource 170 to be duplicated may be selected based on request 1305. For example, network resource proxy 120 may be configured to analyze request 1305 to identify a portion of data within network resource 170 to be accessed by request 1305. The portion of data may be identified based on a category of request 1305, a network location specified in request 1305, or various other properties of request 1305.

In some embodiments, new entity 1370 may include one or more additional resources added to system 100. For example, new entity 1370 may include one or more additional server or virtual machine. New entity 1370 may thus be created to dynamically adjust the amount of computational resources. While a server is used by way of example, new entity 1370 may include various other forms of compute resources and new entity 1370 may allow for autoscaling these resources.

According to some embodiments, new entity 1370 may include generating at least one enhancement to network resource 170. Generating an enhancement may include generating additional data either included within network resource 170 or separate from network resource 170 but in an associative manner with network resource 170. For example, the additional data may be stored within network resource 170, memory 220, network resource proxy 120, database 140, server 150, or any other suitable storage location.

New entity 1370 may provide various forms of enhancements to network resource 170. In some embodiments, new entity 1370 may include an index or other information improving the efficiency at which data can be accessed in network resource 170. For example, new entity 1370 may include an index, which may classify files or other portions of data into various categories. Accordingly, new entity 1370 may allow more efficient access to the indexed data in network resource 170. As another example, new entity 1370 can include a primary key, a foreign key, or both. For example, network resource 170 may include one or more tables and new entity may include a row or column added to the table serving as a primary key to uniquely identify data in the table. In some embodiments, new entity 1370 may further include a foreign key added to the table to indicate a relationship between data in one or more other tables. New entity 1370 may include various other information added to the table, either as columns, rows, or in individual elements. While a table is used by way of example, new entity 1370 may include data added to various other data structures or formats.

In some embodiments, new entity 1370 may include metadata added to various other data. For example, new entity 1370 may include metadata added to various data files within network resource 170. This metadata may be searched, indexed, or otherwise used to identify data more efficiently in network resource 170. In some embodiments, new entity 1370 may include a pointer storing the current position of particular data within network resource 170 (e.g., pointing to a particular file, a position within a file, etc.). Accordingly, the pointer may be referenced in the adapted request. As another example, new entity 1370 may include modifications to data within a file to improve efficiency. For example, the modifications may include changing a format of the data, changing an order of the data, clearing or deleting data determined to be irrelevant or less relevant, reindexing or reordering data, moving data to another location, or the like.

According to some embodiments, new entity 1370 may be generated automatically based on request 1305. For example, network resource proxy 120 may analyze various attributes of request 1305, such as a type of data being accessed, a quantity of data being accessed, an expected duration of the requested action, a number or amount of resources expected to be used to perform the requested action, the size of the resource being accessed, a type of action requested to be performed, a frequency at which the action is to be performed, a frequency at which the resource is to be accessed, an elapsed time since the action was requested previously, an elapsed time since the resource was accessed previously, or various other attributes. Based on the analysis, network resource proxy 120 may identify one or more new entity 1370 that may be generated to improve efficiency, as described further above.

In some embodiments, new entity 1370 may be created based on one or more attributes of network resource 170. For example, new entity 1370 may be created based on an action history associated with new entity 1370. As used herein, an action history may refer to one or more actions associated with network resource 170 that occurred previously. For example, network resource 170, network resource proxy 120, or various other components of system 100 may store a log of events that are performed on or using network resource 170. Step 1330 may include analyzing the action history to create new entity 1370. For example, step 1330 may include profiling the action history on the original network resource to create the new entity.

Consistent with the disclosed embodiments, new entity 1370 may be generated for various durations. In some embodiments, new entity 1370 may be ephemeral. Accordingly, new entity 1370 may be generated for a limited purpose and/or time, after which new entity 1370 may be decommissioned or removed. In some embodiments, new entity 1370 may be generated for a specified period of time. Alternatively or additionally, new entity 1370 may be generated for a particular task, a particular series of tasks, a particular session, or the like. In some embodiments, new entity 1370 may be permanent. In other words, new entity 1370 may be generated for use or indefinitely.

As indicated above, process 1300 may include a step 1335 of adapting request 1305 based on new entity 1370. In embodiments where new entity 1370 includes a new network resource or server, step 1335 may include adapting request 1305 to replace a target associated with the original network resource to a corresponding target associated with the at least one new entity. For example, the adapted request may target data in new entity 1370 rather than corresponding data in the original network resource 170. In some embodiments, step 1330 may include adapting the request based on one or more enhancements provided by new entity 1370. For example, step 1330 may include adapting the request to leverage an index, primary key, metadata, pointer, or various other enhancements described above. Accordingly, performing an action using the adapted request may be more efficient than using the original request 1305.

Process 1300 may further include a step of providing a result 1340 of the action requested through request 1305. Result 1340 may be the same as a result that would have been provided if new entity 1370 was not implemented. However, result 1340 may be provided in a more secure and/or efficient manner than if result 1340 were provided using network resource 170 directly.

Figure 14:
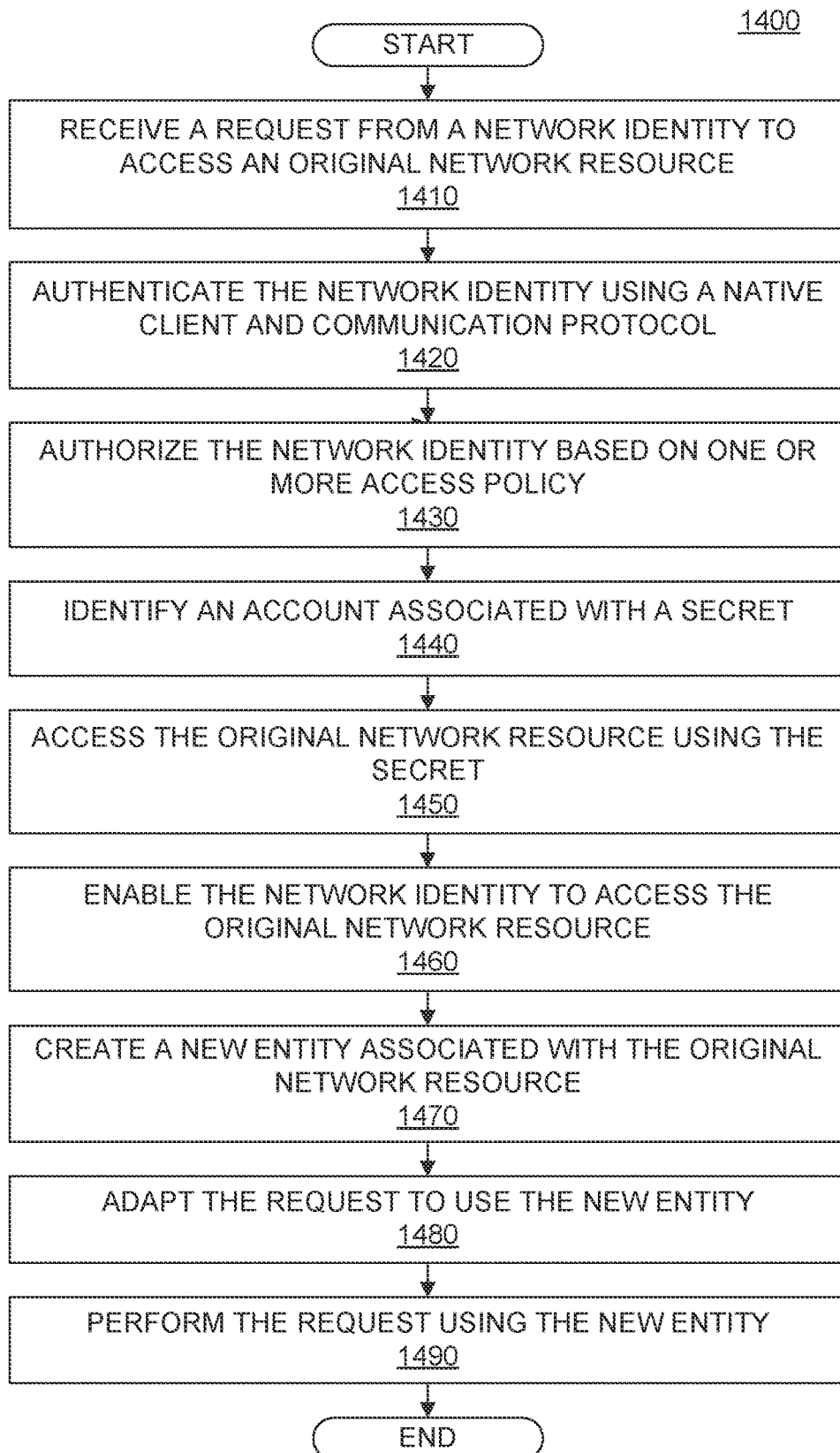
FIG. 14 is a flowchart showing an example process for providing agentless efficient queries for native network resource connections, consistent with disclosed embodiments.

FIG. 14 is a flowchart showing an example process 1400 for providing agentless efficient queries for native network resource connections, consistent with the disclosed embodiments. Process 1400 may be performed by at least one processor of a network resource proxy, which may correspond to processor 210, as described above. Alternatively or additionally, some or all of process 1400 may be performed by at least one separate processor, including a processor of another device or entity of system 100. In some embodiments, a non-transitory computer readable medium may contain instructions that when executed by a processor cause the processor to perform process 1400. Further, process 1400 is not necessarily limited to the steps shown in FIG. 14, and any steps or processes of the various embodiments described throughout the present disclosure may also be included in process 1400, including those described above with respect to, for example, FIGS. 3-13.

In step 1410, process 1400 may include receiving a request from a network identity to access an original network resource. For example, step 1410 may include receiving request 1305, as described above. The requested access may include a request to perform one or more actions on the original network resource. For example, the requested access may include a read request in which network identity 240 requests access to data associated with network resource 170. In other embodiments, the requested access may comprise a request to perform one or more actions on the data within original network resource. For example, the requested action may include a write request in which network identity 240 is requesting permission to modify, delete, or write data on network resource 170.

In step 1420, process 1400 may include authenticating the network identity using a native client and communication protocol. As described above, the native client may be configured for communicating transparently with the original network resource. In some embodiments, authentication of network identity 240 may be performed using a credential of network identity 240. For example, the credential may include a username, password, access code, digital certificate, token, or any other form of information that can be used to authenticate network identity 240.

In step 1430, process 1400 may include authorizing the network identity based on one or more access policy. For example, step 1430 may correspond to step 1315 described above. In some embodiments, authorizing the one or more requested action or command may be performed transparently to the original network resource.

In step 1440, process 1400 may include identifying an account having a secret, based on the one or more access policy. For example, step 1440 may correspond to step 1320 described above. In some embodiments, step 1440 may include generating a least-privilege ephemeral account having ephemeral credentials. Alternatively or additionally, step 1440 may include matching an existing account to network identity 240 and/or fetching credentials of an existing account.

In step 1450, process 1400 may include accessing the original network resource using the secret. For example, step 1450 may correspond to step 1325 described above. In some embodiments, step 1450 may include opening a just-in-time session using the secret (e.g., a privileged account credential, etc.) as described herein.

In step 1460, process 1400 may include enabling the network identity to access the network resource using the account using the native client and communication protocol. For example, step 1460 may include enabling access by network identity 240 to perform an action and receiving an action result using the account.

In step 1470, process 1400 may include creating at least one new entity associated with the original network resource. For example, step 1470 may include creating new entity 1370, as described above. In some embodiments, the at least one new entity may be created based on the request from the network identity. For example, new entity 1370 may be created based on request 1305, as described above. In some embodiments, creating the new entity may include creating a new resource in the original network resource. Alternatively or additionally, the new entity may be a separate network resource. In some embodiments, creating the at least one new entity associated with the original network resource may include generating at least one enhancement to the original network resource. For example, the at least one enhancement may include at least one of an index of the original network resource, a tabulated form of at least a portion of the original network resource, a primary key for the original network resource, a foreign key for the original network resource, a modification to the original network resource, or metadata associated with the original network resource, as described above. In some embodiments, the at least one new entity may be created based on an action history of the original network resource. For example, step 1330 may include profiling the action history on the original network resource to create the new entity.

As described above, in some embodiments, the at least one new entity may be ephemeral. Accordingly, process 1400 may further include decommissioning, terminating, disabling, or deactivating the at least one new entity. For example, the at least one new entity may be nullified based on an elapsed period of time, based on the request being performed, or various other triggers, as described above. Alternatively or additionally, the at least one new entity may be permanent.

In step 1480, process 1400 may include adapting the request to use the at least one new entity. For example, step 1480 may correspond to step 1335 shown in FIG. 13. As described above, adapting the request to use the at least one new entity may include altering at least one aspect of the request to generate an adapted request. For example, the request may include a target associated with the original network resource and adapting the request to use the at least one new entity may include replacing the target associated with the original network resource to a corresponding target associated with the at least one new entity.

In step 1490, process 1400 may include performing the request using the at least one new entity. For example, the request may be performed using the adapted request, as described above. Process 1400 may further include receiving a result of the request being performed on the at least one new entity. For example, this may include receiving result 1340 as described above. The at least one new entity may be configured such that the received result is the same as a result that would be received if the request was performed on the original network resource.

As described herein, a network identity may be authorized to access and/or perform one or more actions on a network resource. According to some embodiments, data within the network resource may be cached for future access. For example, this may include storing data locally in an in-memory cache associated with network identity 240 and/or network resource 170. Additionally or alternatively, a content delivery network (CDN) may be implemented such that cached data may be shared among multiple regions. Accordingly, a requested action may be performed using cached data, rather than data in the network resource. Accordingly, the disclosed techniques may improve, among other things, the security, efficiency, and performance of system 100.

Figure 15:
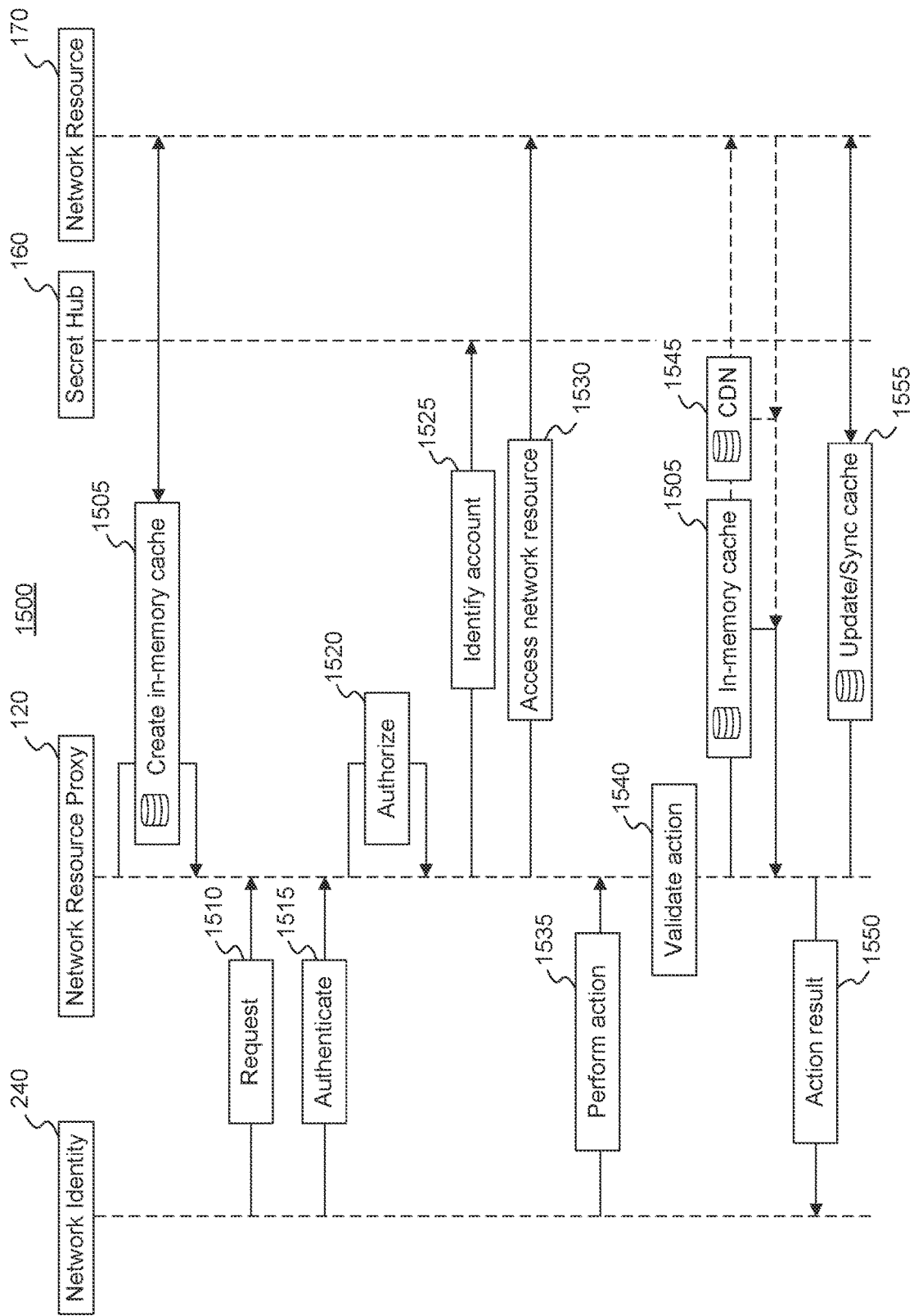
FIG. 15 is a block diagram depicting an exemplary process for providing agentless in-memory caching for native network resource connections, consistent with disclosed embodiments.

FIG. 15 is a block diagram depicting an exemplary process 1500 for providing agentless in-memory caching for native network resource connections, consistent with disclosed embodiments. As described herein, a network identity 240 may request access to network resource 170. For example, as shown in FIG. 15, network identity 240 may submit a request 1510 to access network resource 170. Request 1510 may be received by network resource proxy 120. Process 1500 may include a step 1515 in which network proxy 120 may authenticate network identity 240, and a step 1520 in which network resource proxy 120 may authorize network identity 240 to access network resource 170. In some embodiments, steps 1515 and 1520 may correspond to steps 315 and 320 (and/or steps 415/420 or 715/720), respectively, as described in further detail above.

Process 1500 may further include a step 1525 of identifying an account for accessing network resource 170. Consistent with the disclosed embodiments, the account may be a least-privileged account having permissions to access and perform one or more specific actions on network resource 170. Accordingly, the account may be associated with a secret (e.g., a credential) for accessing network resource 170. In some embodiments, step 1525 may include creating least-privilege ephemeral credentials, as described above with respect to step 330. Alternatively or additionally, step 1525 may include matching an existing least-privilege account, as described above with respect to step 425. Step 1530 may include accessing network resource 170, which may include opening a just-in-time session using ephemeral and/or existing account credentials, as described above.

Consistent with the disclosed embodiments, process 1500 may further include a step for creating an in-memory cache 1505, which may occur before request 1510 is received. In-memory cache 1510 may include any form of memory device capable of at least temporarily storing data from network resource 170. For example, in-memory cache 1510 may be implemented as part of memory 220, database 140, server 150, or the like. In some embodiments, in-memory cache 1510 may include one or more separate cache layer. Accordingly, as used herein, creating an in-memory cache may refer to creating a new in-memory cache or creating a new layer within an existing in-memory cache.

In some embodiments, in-memory cache 1510 may be connected to network 110 such that it is accessible to other network identities in the same region or other regions. For example, in-memory cache 1505 may form part of a content delivery network (CDN), as indicated above. Accordingly, process 1500 may include creating an in-memory cache for a plurality of network identities, which may be based on a relationship of each network identity to the network resource. The caching layers may be shared among each of the network identities for all actions. In some embodiments, the CDN may include multiple regions, each region including in-memory caches for multiple network identities.

In-memory cache 1505 may be created in a variety of ways, as would be appreciated by one of skill in the art. In some embodiments, in-memory cache 1505 may be a cache layer created in association with a new connection with a network identity being formed. For example, the first time network identity 240 connects to system 100 (e.g., via network resource proxy 120), a new cache layer may be formed. In some embodiments, in-memory cache 1505 may include an initial "zero" state, in which in-memory cache 1505 may be empty or may contain various initial data. In some embodiments, the initial data may be fetched from network identity 240 during or after the creation phase. For example, the initial data may include metadata associated with network identity 240, metadata associated with network resource 170, or the like. In some embodiments, in-memory cache 1505 may initially include at least some data from network resource 170. For example, in-memory cache 1505 may automatically be populated with certain tables, rows, columns, files, or other forms of information.

Alternatively or additionally, in-memory cache 1505 may be created based on an action being performed by network identity 240 for the first time. For example, a connection between network identity 240 and network resource 170 may have been created previously, but in-memory cache 1505 may be created when network identity 240 accesses data from network resource 170. As described further below, data may be added to in-memory cache 1505 as it is accessed as part of a request.

Process 1500 may include a step 1535 for performing an action, as indicated in the request. As indicated above, the request may be to perform an action including accessing data from network resource 170 or a command such as deleting, adding, or modifying data on network resource 170. If possible, the action may be performed on in-memory cache 1505 instead of on network resource 170, as indicated in FIG. 15. For example, step 1535 may include determining whether data required for performing the requested action is available in in-memory cache 1505. If so, the action may be performed using the data in in-memory cache 1505. If the data is not available (i.e., there are no "hits" in in-memory cache 1505), the action may be performed using network resource 170, consistent with the various embodiments described herein. When an action is performed on network resource 170, a result of the action (i.e., the data accessed in network resource 170) may be stored in in-memory cache 1505 for future actions.

In-memory cache 1505 may be identified in various ways. Once network identity 240 requests to perform an action, a corresponding in-memory cache may be selected (in this case, in-memory cache 1505). In some embodiments, in-memory cache 1505 may be selected based on metadata associated with network identity 240. For example, step 1535 may include matching (or at least partially matching) various metadata associated with network identity 240 with metadata indicated in in-memory cache 1505. As described above, metadata associated with network identity 240 may be stored within in-memory cache 1505 during an initiation phase, when performing subsequent actions, or various other phases. Example metadata associated with network identity 240 may include a group and/or role associated with network identity 240, a permission asserted by network identity 240, an identifier of a client machine (e.g., computing device 130) used by network identity 240, an IP address associated with network identity 240, or the like.

In some embodiments, the requested action may be performed on a cache within a CDN, as indicated above. For example, if there are no hits in in-memory cache 1505, step 1535 may include accessing content delivery network 1545. This may include routing the requested action to one or more other caches within the regional content delivery network. In some embodiments, this may include selecting a region or cache with similar policies (e.g., the closest region with compatible policies, etc.). If the necessary data is available in content delivery network 1545, the data may be retrieved from content delivery network 1545 to perform the action. In some embodiments, this may further include storing the data from content delivery network 1545 in in-memory cache 1505, and performing the action on the data stored in in-memory cache 1505. If there are no hits in either in-memory cache 1505 or content delivery network 1545 the request may be performed on network resource 170 and cached in in-memory cache 1505 as described above.

In some embodiments, process 1500 may further include a step 1540 for validating the action prior to performing the action. For example, network resource 170 and/or in-memory cache 1505 may include one or more caching policies defining how and whether in-memory cache 1505 may be used to perform an action. These caching policies may be defined, for example, by an administrator of system 100, user 131, an organization associated with 100 or various components thereof, or the like. In some embodiments, the caching policy may define conditions required for using in-memory cache 1505 to perform the action. In some embodiments, the conditions may be based on a timing profile or requirement. For example, in-memory cache 1505 may be used during certain times of day, certain times of the week, certain times of the month, or the like. Alternatively or additionally, the conditions may be based on a type of action requested. For example, actions may be performed either on in-memory cache 1505 or network resource 170 based on whether they include a read action, a write action, an update action, a deletion action, an insertion action, based on a type of SQL action (e.g., data manipulation language (DML) vs. data definition language (DLL)), or various other types of actions. As another example, a condition may be based on the type of resource being accessed. For example, in-memory cache 1505 may be used only for particular network resources (or groups of network resources), only for network resources having predefined parameters, only for network resources having certain metadata, or the like.

In step 1550, the result of the action may be provided to network identity 240, as described above. In some embodiments, process 1500 may include an updating and/or syncing step 1555. For example, if an action is performed in which data in in-memory cache 1505 is altered, step 1555 may include updating network resource 170 to reflect the update. Conversely, if network resource 170 is updated (e.g., by another network identity), in-memory cache 1505 may be updated to reflect the change. Accordingly, the data stored in-memory cache 1505 and network resource 170 may be synced.

Figure 16:
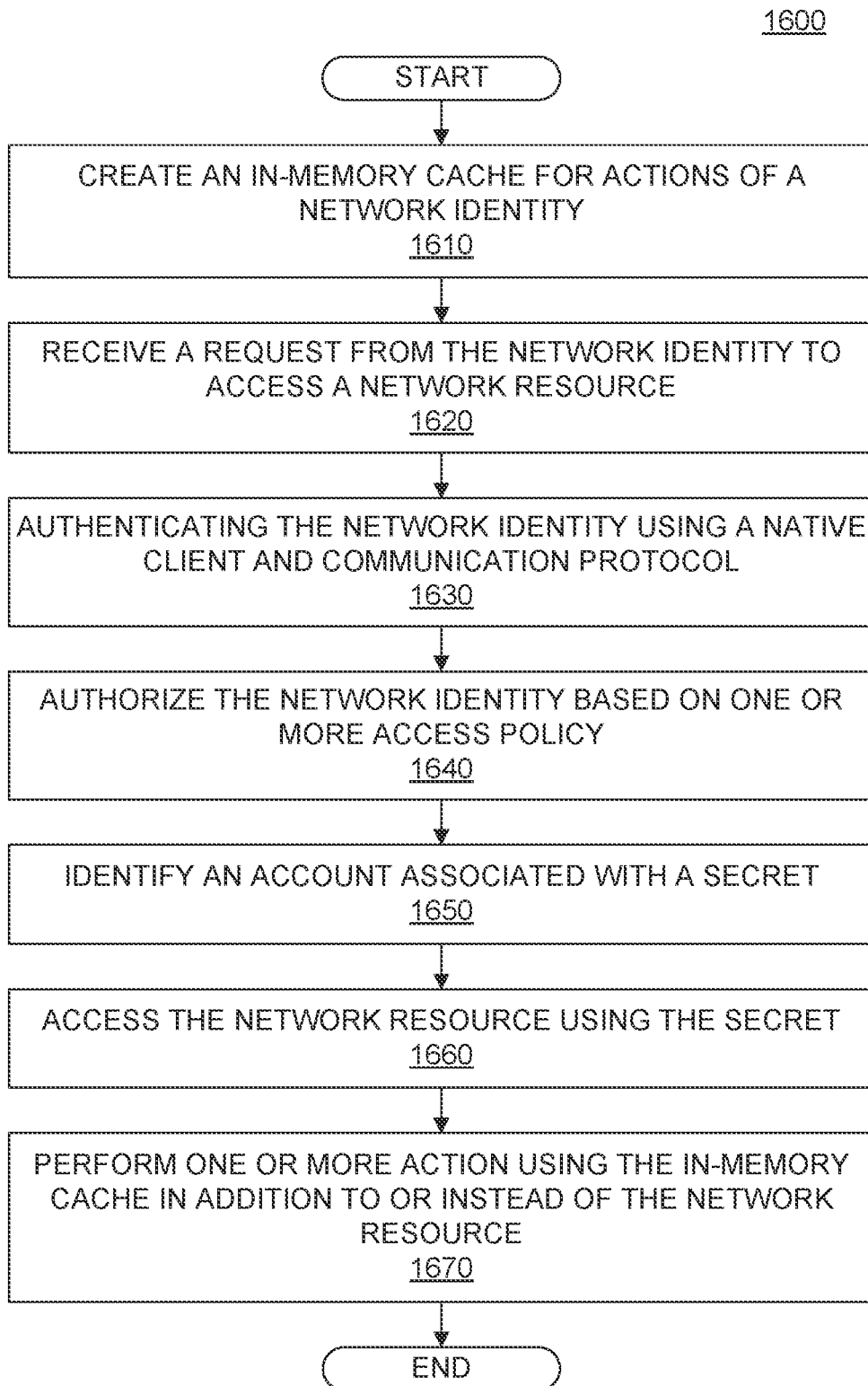
FIG. 16 is a flowchart showing an example process for providing agentless in-memory caching for native network resource connections, consistent with disclosed embodiments.

FIG. 16 is a flowchart showing an example process 1600 for providing agentless in-memory caching for native network resource connections, consistent with disclosed embodiments. Process 1600 may be performed by at least one processor of a network resource proxy, which may correspond to processor 210, as described above. Alternatively or additionally, some or all of process 1600 may be performed by at least one separate processor, including a processor of another device or entity of system 100. In some embodiments, a non-transitory computer readable medium may contain instructions that when executed by a processor cause the processor to perform process 1600. Further, process 1600 is not necessarily limited to the steps shown in FIG. 16, and any steps or processes of the various embodiments described throughout the present disclosure may also be included in process 1600, including those described above with respect to, for example, FIGS. 3-15.

In step 1610, process 1600 may include creating an in-memory cache for one or more actions of a network identity. For example, step 1610 may include creating in-memory cache 1505. As described above, step 1610 may include creating a new cache, or adding a layer to an existing cache. Accordingly, step 1610 may include creating one or more layers of the in-memory cache. In some embodiments, the in-memory cache may be created based on metadata of the network identity. For example, the metadata may be stored as part of the in-memory cache, as described above. Example metadata of the network identity may include a group and/or role associated with the network identity, a permission asserted by the network identity, an identifier of a client machine (e.g., computing device 130) used by the network identity, an IP address associated with the network identity, or the like. In some embodiments, the in-memory cache may be created for multiple different network identities. For example, step 1610 may include creating the in-memory cache for a plurality of network identities, and the in-memory cache may be created based on a relationship of each of the plurality of network identities to the network resource. Accordingly, the caching layers can be shared for all the network identities for all their actions.

In step 1620, process 1600 may include receiving a request from the network identity to access a network resource. For example, step 1610 may include receiving request 1510, as described above. The requested access may include a request to perform one or more actions on the original network resource. For example, the requested access may include a read request in which network identity 240 requests access to data associated with network resource 170. In other embodiments, the requested access may comprise a request to perform one or more actions on the data within the network resource. For example, the requested action may include a write request in which network identity 240 is requesting permission to modify, delete, or write data on network resource 170.

In step 1630, process 1600 may include authenticating the network identity using a native client and communication protocol. As described above, the native client may be configured for communicating transparently with the original network resource. In some embodiments, authentication of network identity 240 may be performed using a credential of network identity 240. For example, the credential may include a username, password, access code, digital certificate, token, or any other form of information that can be used to authenticate network identity 240.

In step 1640, process 1600 may include authorizing the network identity based on one or more access policy. For example, step 1640 may correspond to step 1520 described above. In some embodiments, authorizing the one or more requested action or command may be performed transparently to the original network resource.

In step 1650, process 1600 may include identifying an account having a secret, based on the one or more access policy. For example, step 1650 may correspond to step 1525 described above. In some embodiments, step 1650 may include generating a least-privilege ephemeral account having ephemeral credentials. Alternatively or additionally, step 1650 may include matching an existing account to network identity 240 and/or fetching credentials of an existing account.

In step 1660, process 1600 may include accessing the network resource using the secret. For example, step 1660 may correspond to step 1530 described above. In some embodiments, step 1660 may include accessing the network resource through a just-in-time session, as described herein.

In step 1670, process 1600 may include performing one or more action using the in-memory cache in addition to or instead of the network resource. For example, this may include allowing network identity 240 to perform an action in step 1535, as described above. In some embodiments, step 1670 may further include validating the one or more action. In some embodiments, the one or more action may be validated based on one or more policies. For example, network resource proxy 120 may access caching policies or conditions for deciding when and how to use the cache layer. In some embodiments, the one or more action may be performed using the in-memory cache based on metadata of the network identity. For example, as described above, the in-memory cache may be created using various metadata associated with the network identity. When performing the action, metadata associated with the network identity may be provided as part of the request, which may be compared to the metadata stored in the in-memory cache to select an appropriate in-memory cache. In some embodiments, the one or more action may be performed using the in-memory cache based on metadata of the network resource. For example, the in-memory cache may be used only for particular network resources (or groups of network resources), only for network resources having predefined parameters, only for network resources having certain metadata, or the like. As another example, the one or more action may be performed using the in-memory cache based on the type of the one or more actions. For example, as described above, the type of action may include a read action, a write action, an update action, a deletion action, an insertion action, based on a type of SQL action (e.g., data manipulation language (DML) vs. data definition language (DLL)), or various other types of actions.

In some embodiments, process 1600 may include various additional actions based on whether the one or more actions may be performed using the in-memory cache. For example, process 1600 may further include determining there is no hit on the in-memory cache, and accessing a regional content delivery network (CDN) of caching. For example, this may include accessing content delivery network 1545, as described above. Consistent with the present disclosure, the one or more requested action may be routed to a closest caching region with fitting CDN policies. If the one or more requested action cannot be performed using the content delivery network, network resource 170 may be used. For example, process 1600 may further include determining that there are no hits in both the in-memory cache and the regional CDN, accessing the network resource, and caching resulting information.

In some embodiments, process 1600 may further include steps to ensure data is consistent between the in-memory cache (and/or content delivery network) and the network resource. For example, process 1600 may include synchronizing the in-memory cache with data stored in the network resource. Alternatively or additionally, process 1600 may further include updating the in-memory cache based on the one or more action.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A non-transitory computer readable storage medium including instructions that, when executed by at least one processor, cause the at least one processor to perform operations for providing agentless single sign on for native access to secure network resources, the operations comprising:

receiving a request from a network identity to access a network resource;

authenticating the network identity using a native client and communication protocol through an authentication process with the native client, wherein the native client is configured for communicating transparently with the at least one network resource;

sending a first secret to the network identity through the native client;

receiving a second request from the network identity to access the network resource;

authenticating the network identity responsive to the second request using the native client, wherein authenticating the network identity comprises receiving the first secret from the network identity;

authorizing, through the native client, the network identity based on one or more access policy, the one or more access policy comprising rules for accessibility of the at least one network resource;

identifying, based on the one or more access policy, an account associated with a second secret;

creating, through the native client, a just-in-time session to access the network resource using the second secret; and enabling the network identity to access the at least one network resource using the account using the native client and communication protocol through the just-in-time session.

2. The non-transitory computer readable storage medium of claim 1, wherein authenticating the network identity comprises multi-factor authentication.

3. The non-transitory computer readable storage medium of claim 1, wherein the operations further comprise sending the first secret to the network identity automatically after the network identity is authenticated.

4. The non-transitory computer readable storage medium of claim 1, wherein the operations further comprise sending the first secret to the network identity in response to a command triggered by the network identity as part of the native communication protocol.

5. The non-transitory computer readable storage medium of claim 1, wherein the first secret comprises at least one of: a binary file, a textual file, binary data, textual data, or a certificate.

6. The non-transitory computer readable storage medium of claim 1, wherein authenticating the network identity responsive to the second request further comprises receiving data associated with the network identity.

7. The non-transitory computer readable storage medium of claim 6, wherein the data includes at least one of: a username of the network identity; a group the network identity is associated with; a role the network identity is associated with; a type of authentication used for the network identity; an IP address associated with the network identity; a type of the native client; a location of the network identity; a network provider for the network identity; a license associated with the network identity; or a device identifier.

8. The non-transitory computer readable storage medium of claim 7, wherein authenticating the network identity responsive to the second request further includes using the data to enforce additional rules for accessibility of the network resource or the additional network resource.

9. The non-transitory computer readable storage medium of claim 6, wherein the operations further comprise:
receiving from the network identity second data associated with the network identity;
comparing the data to the second data; and
authorizing the network identity based on the comparison.

10. The non-transitory computer readable storage medium of claim 9, wherein the operations further comprise, based on a determination that the data at least partially matches the second data, validating the first secret.

11. The non-transitory computer readable storage medium of claim 9, wherein the operations further comprise, based on a determination that the data does not match the second data, performing at least one security action.

12. The non-transitory computer readable storage medium of claim 1, wherein the just-in-time session is associated with an additional account, the additional account being different from the account associated with the second secret.

13. The non-transitory computer readable storage medium of claim 1, wherein the just-in-time session is associated with an additional secret, the additional secret being different from the second secret.

14. The non-transitory computer readable storage medium of claim 1, wherein the first secret is received as part of the second request.

15. The non-transitory computer readable storage medium of claim 1, wherein the authentication responsive to the second request is part of an interactive session with the network resource and wherein the first secret is received through the interactive session.

16. A method for providing agentless single sign on for native access to secure network resources, the method comprising:

receiving a request from a network identity to access at least one network resource;
authenticating the network identity using a native client and communication protocol through an authentication process with the native client, wherein the native client is configured for communicating transparently with the at least one network resource;
sending a first secret to the network identity through the native client;
receiving a second request from the network identity to access the network resource;
authenticating the network identity responsive to the second request using the native client, wherein authenticating the network identity comprises receiving the first secret from the network identity;
authorizing, through the native client, the network identity based on one or more access policy, the one or more access policy comprising rules for accessibility of the at least one network resource;
identifying, based on the one or more access policy, an account associated with a second secret;
creating, through the native client, a just-in-time session to access the network resource using the second secret; and
enabling the network identity to access the at least one network resource using the account using the native client and communication protocol through the just-in-time session.

17. The method of claim 16, wherein authenticating the network identity responsive to the second request further comprises receiving data associated with the network identity.

18. The method of claim 16, wherein the data includes at least one of: a username of the network identity; a group the network identity is associated with; a role the network identity is associated with; a type of authentication used for the network identity; an IP address associated with the network identity; a type of the native client; a location of the network identity; a network provider for the network identity; a license associated with the network identity; or a device identifier.

* * * * *